(12) United States Patent
Lu et al.

(10) Patent No.: US 11,039,145 B2
(45) Date of Patent: Jun. 15, 2021

(54) IMAGE PREDICTION METHOD AND APPARATUS

(71) Applicant: Huawei Technologies Co., Ltd., Shenzhen (CN)

(72) Inventors: Xiaomu Lu, Shenzhen (CN); Shan Gao, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/662,627

(22) Filed: Oct. 24, 2019

(65) Prior Publication Data

US 2020/0059650 A1 Feb. 20, 2020

Related U.S. Application Data

(63) Continuation of application No. PCT/CN2018/084955, filed on Apr. 27, 2018.

(30) Foreign Application Priority Data

Apr. 28, 2017 (CN) .......................... 201710300302.4

(51) Int. Cl.
*H04B 1/66* (2006.01)
*H04N 7/12* (2006.01)
(Continued)

(52) U.S. Cl.
CPC .......... *H04N 19/14* (2014.11); *H04N 19/117* (2014.11); *H04N 19/176* (2014.11); *H04N 19/182* (2014.11); *H04N 19/593* (2014.11)

(58) Field of Classification Search
CPC ..... H04N 19/117; H04N 19/14; H04N 19/176
See application file for complete search history.

(56) References Cited

U.S. PATENT DOCUMENTS

2002/0196854 A1  12/2002  Kim
2005/0201462 A1  9/2005  Ridge et al.
(Continued)

FOREIGN PATENT DOCUMENTS

CN  101668207 A  3/2010
CN  101919253 A  12/2010
(Continued)

OTHER PUBLICATIONS

Foreign Communication From a Counterpart Application, PCT Application No. PCT/CN2018/084955, English Translation of International Search Report dated Jul. 24, 2018, 2 pages.
(Continued)

*Primary Examiner* — Fabio S Lima
(74) *Attorney, Agent, or Firm* — Conley Rose, P.C.

(57) ABSTRACT

An image prediction method and a related product, where the image prediction method includes performing intra-frame prediction on a current block using a reference block to obtain an initial predicted pixel value of a pixel in the current block, and performing weighted filtering on the initial predicted pixel value of the pixel in the current block to obtain a predicted pixel value of the pixel in the current block. Weighting coefficients used for the weighted filtering include a horizontal weighting coefficient and a vertical weighting coefficient, and a first attenuation rate factor acting on the horizontal weighting coefficient is different from a second attenuation rate factor acting on the vertical weighting coefficient.

21 Claims, 14 Drawing Sheets

(51) Int. Cl.
*H04N 11/02* (2006.01)
*H04N 11/04* (2006.01)
*H04N 19/14* (2014.01)
*H04N 19/117* (2014.01)
*H04N 19/176* (2014.01)
*H04N 19/182* (2014.01)
*H04N 19/593* (2014.01)

(56) References Cited

U.S. PATENT DOCUMENTS

| | | |
|---|---|---|
| 2009/0175336 A1 | 7/2009 | Karczewicz et al. |
| 2010/0061446 A1* | 3/2010 | Hands ............... H04N 19/115 375/240.02 |
| 2011/0090351 A1 | 4/2011 | Cote et al. |
| 2011/0229047 A1 | 9/2011 | Shimauchi et al. |
| 2012/0140821 A1* | 6/2012 | Drugeon ............ H04N 19/11 375/240.12 |
| 2014/0177714 A1 | 6/2014 | Grange et al. |
| 2020/0077090 A1* | 3/2020 | Wennersten ......... H04N 19/182 |
| 2020/0128243 A1* | 4/2020 | Wang .................. H04N 19/17 |
| 2020/0236361 A1* | 7/2020 | Jang ................... H04N 19/117 |

FOREIGN PATENT DOCUMENTS

| | | |
|---|---|---|
| CN | 102196265 A | 9/2011 |
| CN | 102640184 A | 8/2012 |
| EP | 1723799 A1 | 11/2006 |
| WO | 2005094082 A1 | 10/2005 |

OTHER PUBLICATIONS

Foreign Communication From a Counterpart Application, PCT Application No. PCT/CN2018/084955, English Translation of Written Opinion dated Jul. 24, 2018, 4 pages.

* cited by examiner

| 42 | 42 | 42 | 42 | 42 | 42 | 42 |
|---|---|---|---|---|---|---|
| 21 | 21 | 21 | 21 | 21 | 21 | 21 |
| 10 | 10 | 10 | 10 | 10 | 10 | 10 |
| 5 | 5 | 5 | 5 | 5 | 5 | 5 |
| 2 | 2 | 2 | 2 | 2 | 2 | 2 |
| 1 | 1 | 1 | 1 | 1 | 1 | 1 |
| 0 | 0 | 0 | 0 | 0 | 0 | 0 |
| | | | ... | | | |

FIG. 5A

| 46 | 46 | 46 | 46 | 46 | 46 | 46 |
|---|---|---|---|---|---|---|
| 23 | 23 | 23 | 23 | 23 | 23 | 23 |
| 11 | 11 | 11 | 11 | 11 | 11 | 11 |
| 5 | 5 | 5 | 5 | 5 | 5 | 5 |
| 2 | 2 | 2 | 2 | 2 | 2 | 2 |
| 1 | 1 | 1 | 1 | 1 | 1 | 1 |
| 0 | 0 | 0 | 0 | 0 | 0 | 0 |
| | | | ... | | | |

FIG. 5B

| 42 | 42 | 42 | 42 | 42 | 42 | 42 |
|----|----|----|----|----|----|----|
| 42 | 42 | 42 | 42 | 42 | 42 | 42 |
| 21 | 21 | 21 | 21 | 21 | 21 | 21 |
| 21 | 21 | 21 | 21 | 21 | 21 | 21 |
| 10 | 10 | 10 | 10 | 10 | 10 | 10 |
| 10 | 10 | 10 | 10 | 10 | 10 | 10 |
| 5  | 5  | 5  | 5  | 5  | 5  | 5  |
| 5  | 5  | 5  | 5  | 5  | 5  | 5  |
| 1  | 1  | 1  | 1  | 1  | 1  | 1  |
| 1  | 1  | 1  | 1  | 1  | 1  | 1  |
| 0  | 0  | 0  | 0  | 0  | 0  | 0  |
|    |    |    | ...|    |    |    |

IMAGE PREDICTION METHOD AND APPARATUS

CROSS-REFERENCE TO RELATED APPLICATIONS

This application is a continuation of International Patent Application No. PCT/CN2018/084955 filed on Apr. 27, 2018, which claims priority to Chinese Patent Application No. 201710300302.4 filed on Apr. 28, 2017. The disclosures of the aforementioned applications are hereby incorporated by reference in their entireties.

TECHNICAL FIELD

This application relates to the field of video image processing, and in particular, to an image prediction method and a related product.

BACKGROUND

With development of photoelectric acquisition technologies and continuous increase of requirements for high-definition digital videos, an amount of video data is increasingly large. Due to limited heterogeneous transmission bandwidth and diversified video applications, higher requirements are continuously imposed on video coding efficiency. A task of developing a high efficiency video coding (HEVC) standard is initiated as required. A basic principle of video compression coding is to use a correlation among space domain, time domain, and a code word to remove redundancy to the greatest extent. Currently, a prevalent method is to use a block-based hybrid video coding framework to implement video compression coding by performing steps such as prediction (including intra-frame prediction and inter prediction), transformation, quantization, and entropy encoding. This coding framework is very viable, and therefore the block-based hybrid video coding framework is still used in the HEVC.

In the HEVC standard, an image is usually divided into a plurality of square code units (coding unit (CU)) for encoding. In most cases, horizontal and vertical texture features of a CU are approximately the same such that relatively good prediction accuracy can be obtained using a conventional image prediction method. However, it is found, through testing, that in some cases in which horizontal and vertical texture features of a CU are quite different, it is difficult to obtain relatively good prediction accuracy using the conventional image prediction method.

SUMMARY

Embodiments of this application provide an image prediction method and a related product.

According to a first aspect, an embodiment of this application provides an image prediction method, including performing intra-frame prediction on a current block using a reference block, to obtain an initial predicted pixel value of a pixel in the current block, and performing weighted filtering on the initial predicted pixel value of the pixel in the current block to obtain a predicted pixel value of the pixel in the current block. Weighting coefficients used for the weighted filtering include a horizontal weighting coefficient and a vertical weighting coefficient, and an attenuation rate factor acting on the horizontal weighting coefficient is different from an attenuation rate factor acting on the vertical weighting coefficient.

Further, for example, when a difference between a horizontal texture feature and a vertical texture feature of the current block exceeds a difference threshold, the attenuation rate factor acting on the horizontal weighting coefficient is different from the attenuation rate factor acting on the vertical weighting coefficient.

For another example, when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

It can be understood that, when the difference between the horizontal texture feature and the vertical texture feature of the current block cannot be learned of in advance, the difference between the horizontal texture feature and the vertical texture feature of the current block may be first determined, and then the attenuation rate factor acting on the horizontal weighting coefficient and the attenuation rate factor acting on the vertical weighting coefficient are determined based on the determined difference between the horizontal texture feature and the vertical texture feature of the current block.

Certainly, if the difference between the horizontal texture feature and the vertical texture feature of the current block is known and determined in advance (for example, assuming that a texture feature is a side length, and the current block is obtained through division in a specific division manner, a shape and a size of the current block are a known and determined parameter, and therefore a difference between a length and a width of the current block is a known and determined parameter), it may be alternatively considered that the attenuation rate factor acting on the horizontal weighting coefficient and the attenuation rate factor acting on the vertical weighting coefficient are correspondingly determined such that the step in which "the difference between the horizontal texture feature and the vertical texture feature of the current block is first determined, and then the attenuation rate factor acting on the horizontal weighting coefficient and the attenuation rate factor acting on the vertical weighting coefficient are determined based on the determined difference between the horizontal texture feature and the vertical texture feature of the current block" does not need to be performed.

That is, when it is known and determined that "the difference between the horizontal texture feature and the vertical texture feature of the current block exceeds the difference threshold" or "the difference between the horizontal texture feature and the vertical texture feature of the current block does not exceed the difference threshold", the attenuation rate factor acting on the horizontal weighting coefficient and the attenuation rate factor acting on the vertical weighting coefficient may be correspondingly selected directly based on a current known and determined case without a need of determining a condition of "whether the difference between the horizontal texture feature and the vertical texture feature of the current block exceeds the difference threshold".

The intra-frame prediction mentioned in each embodiment of this application is, for example, directional intra-frame prediction, direct current coefficient intra-frame prediction, interpolation intra-frame prediction, or another intra-frame prediction.

The image prediction method in each embodiment of this application may be applied to, for example, a video coding process or a video decoding process.

The reference blocks of the current block may include, for example, a top adjacent reference block, a left adjacent reference block, and a top-left adjacent reference block of the current block.

The attenuation rate factor may be equal to, for example, 1, 1.5, 1.65, 2, 3, or another value.

The texture feature may include, for example, the side length, an auto variance, and/or edge acutance. Therefore, the horizontal texture feature may include a horizontal side length (e.g., length), a horizontal auto variance, horizontal edge acutance, and/or the like, and the vertical texture feature may include a vertical side length (e.g., width), a vertical auto variance, vertical edge acutance, and/or the like.

It can be understood that the difference threshold may be of various value types because the texture feature is of various parameter types (for example, the side length, the auto variance, and/or the edge acutance).

It can be understood that an attenuation rate factor reflects, to some extent, an attenuation rate of a weighting coefficient on which the attenuation rate factor acts. Different attenuation rate factors may bring different attenuation rates of weighting coefficients on which the different attenuation rate factors act. Whether the attenuation rate factor acting on the horizontal weighting coefficient is the same as the attenuation rate factor acting on the vertical weighting coefficient mainly depends on the difference between the horizontal texture feature and the vertical texture feature of the current block.

It can be learned that, in the foregoing technical solution, the weighting coefficients used to perform weighted filtering on the initial predicted pixel value of the pixel in the current block include the horizontal weighting coefficient and the vertical weighting coefficient, and different attenuation rate factors are set for the vertical weighting coefficient and the horizontal weighting coefficient. That is, the attenuation rate factor acting on the horizontal weighting coefficient may be different from the attenuation rate factor acting on the vertical weighting coefficient. Therefore, this helps differentially control attenuation rates of the vertical weighting coefficient and the horizontal weighting coefficient, further helps meet a requirement in some scenarios in which the vertical weighting coefficient and the horizontal weighting coefficient need to be attenuated at different attenuation rates, and helps improve image prediction accuracy because flexibility of controlling the attenuation rates of the vertical weighting coefficient and the horizontal weighting coefficient is improved. For example, when the difference between the horizontal texture feature and the vertical texture feature of the current block exceeds the difference threshold, a weighting coefficient attenuation rate difference better matches a texture feature difference, thereby helping improve the image prediction accuracy.

For example, in some possible implementations, performing intra-frame prediction on a current block using a reference block to obtain an initial predicted pixel value of a pixel in the current block may include filtering a reconstructed pixel value of a reference pixel in the reference block to obtain a filtered pixel value of the reference pixel in the reference block, and performing intra-frame prediction on the current block using the filtered pixel value of the reference pixel in the reference block to obtain the initial predicted pixel value of the pixel in the current block.

For another example, in other possible implementations, performing intra-frame prediction on a current block using a reference block to obtain an initial predicted pixel value of a pixel in the current block may include performing intra-frame prediction on the current block using a reconstructed pixel value of a reference pixel in the reference block to obtain the initial predicted pixel value of the pixel in the current block.

There may be various weighted filtering formulas used for the weighted filtering.

For example, performing the weighted filtering on the initial predicted pixel value of the pixel in the current block to obtain a predicted pixel value of the pixel in the current block may include performing weighted filtering on the initial predicted pixel value of the pixel in the current block according to the following weighted filtering formulas to obtain the predicted pixel value of the pixel in the current block:

$$p''[x, y] = \left\{ \begin{array}{l} (c_{top} \gg [y/d_2])r[x, -1] - (c_{topleft} \gg [x/d_1])r[-1, -1] + \\ (c_{left} \gg [x/d_1])r[-1, y] + c_{cur}p'[x, y] + 32 \end{array} \right\} \gg 6;$$

$$\text{and } c_{cur} = 64 - (c_{top} \gg [y/d_2]) - (c_{left} \gg [x/d_1]) + (c_{topleft} \gg [x/d_1]),$$

where $c_{top}$ is a horizontal weighting coefficient, and $c_{left}$ and $c_{topleft}$ are vertical weighting coefficients, and $c_{top}$ represents a weighting coefficient corresponding to a reconstructed pixel value of a top adjacent reference block of the current block, $c_{left}$ represents a weighting coefficient corresponding to a reconstructed pixel value of a left adjacent reference block of the current block, $c_{topleft}$ represents a weighting coefficient corresponding to a reconstructed pixel value of a top-left adjacent reference block of the current block, x represents a horizontal coordinate of a pixel in the current block relative to a top-left vertex of the current block, y represents a vertical coordinate of the pixel in the current block relative to the top-left vertex of the current block, $d_2$ is the attenuation rate factor acting on the horizontal weighting coefficient, $d_1$ is the attenuation rate factor acting on the vertical weighting coefficient, $d_1$ and $d_2$ are real numbers, p''[x, y] represents a predicted pixel value of a pixel whose coordinates are [x, y] in the current block, p'[x, y] represents an initial predicted pixel value of the pixel whose coordinates are [x, y] in the current block, r[x, −1] represents a reconstructed pixel value of a pixel whose coordinates are [x, −1] in the top adjacent reference block of the current block, r[−1, −1] represents a reconstructed pixel value of a pixel whose coordinates are [−1, −1] in the top-left adjacent reference block of the current block, and r[−1, y] represents a reconstructed pixel value of a pixel whose coordinates are [−1, y] in the left adjacent reference block of the current block.

There may be various manners of determining values of the attenuation rate factors $d_1$ and $d_2$.

For example, when the texture feature includes the side length, the difference threshold includes a threshold thresh1, and a ratio of a length to a width of the current block is greater than the threshold thresh1, for example, $d_1$=1, and $d_2$=2, and when a ratio of the width to the length of the current block is greater than the threshold thresh1, for example, $d_1$=2, and $d_2$=1, where thresh1 is a real number greater than 2. For example, thresh1 is equal to 2.5, 4, 6, 8, 16, 32, or another value.

Further, when the ratio of the length to the width of the current block is less than the threshold thresh1, the length of the current block is greater than or equal to the width, and when a sum of the length and the width of the current block is greater than a threshold thresh4, $d_1=d_2=2$, and/or when the ratio of the length to the width of the current block is less than the threshold thresh1, the length of the current block is greater than or equal to the width, and the sum of the length and the width of the current block is less than or equal to the threshold thresh4, $d_1=d_2=1$.

Herein, thresh4 is a real number greater than or equal to 64. For example, thresh4 is equal to 64, 65, 80, 96, 128, or another value.

For another example, when a length of the current block is greater than a threshold thresh2, $d_1=2$, or when the length of the current block is less than or equal to the threshold thresh2, $d_1=1$, where thresh2 is a real number greater than or equal to 16. For example, thresh2 is equal to 16, 17, 32, 64, 128, or another value.

For another example, when a width of the current block is greater than a threshold thresh3, $d_2=2$, or when the width of the current block is less than or equal to the threshold thresh3, $d_2=1$, where thresh3 is a real number greater than or equal to 16. For example, thresh3 is equal to 16, 18, 32, 64, 128, or another value.

According to a second aspect, an embodiment of this application provides an image prediction apparatus, including several function units configured to implement any method in the first aspect. For example, the image prediction apparatus may include a prediction unit and a filtering unit.

The prediction unit is configured to perform intra-frame prediction on a current block using a reference block to obtain an initial predicted pixel value of a pixel in the current block.

The filtering unit is configured to perform weighted filtering on the initial predicted pixel value of the pixel in the current block to obtain a predicted pixel value of the pixel in the current block, where weighting coefficients used for the weighted filtering include a horizontal weighting coefficient and a vertical weighting coefficient, and an attenuation rate factor acting on the horizontal weighting coefficient is different from an attenuation rate factor acting on the vertical weighting coefficient.

Further, for example, when a difference between a horizontal texture feature and a vertical texture feature of the current block exceeds a difference threshold, the attenuation rate factor acting on the horizontal weighting coefficient is different from the attenuation rate factor acting on the vertical weighting coefficient.

For another example, when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

The image prediction apparatus is, for example, a video coding apparatus or a video decoding apparatus.

According to a third aspect, an embodiment of this application provides an image prediction apparatus, including a memory and a processor that are coupled to each other, where the processor is configured to perform some or all of the steps of any method in the first aspect.

According to a fourth aspect, an embodiment of this application provides a computer readable storage medium, the computer readable storage medium stores program code, and the program code includes an instruction used to perform some or all of the steps of any method in the first aspect.

According to a fifth aspect, an embodiment of this application provides a computer program product, and when the computer program product runs on a computer, the computer performs some or all of the steps of any method in the first aspect.

BRIEF DESCRIPTION OF DRAWINGS

The following describes the accompanying drawings describing some of the embodiments of this application.

FIG. 5A, FIG. 5B, and FIG. 5C are schematic diagrams of several attenuation processes of $c_{top}$ according to an embodiment of this application;

FIG. 6 is a schematic diagram of an image prediction apparatus according to an embodiment of this application;

DESCRIPTION OF EMBODIMENTS

Figure 1A:
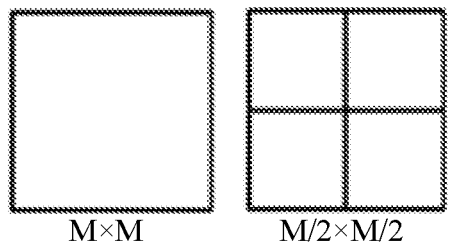
FIG. 1A and FIG. 1B are schematic diagrams of several image block partitioning modes according to an embodiment of this application.

The foregoing descriptions are merely specific implementations of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

The following describes the embodiments of this application with reference to the accompanying drawings in the embodiments of this application.

The following describes an image prediction method, a video coding method, and a video decoding method provided in the embodiments of this application. The image prediction method provided in the embodiments of this application is executed by a video coding apparatus or a video decoding apparatus. The video coding apparatus or the video decoding apparatus may be any apparatus that needs to output or store a video, such as a notebook computer, a tablet computer, a personal computer, a mobile phone, a video server, a digital television, a digital live broadcasting system, a wireless broadcasting system, a personal digital assistant (PDA), a laptop or desktop computer, an electronic book (e-book) reader, a digital camera, a digital recording apparatus, a digital media player, a video game apparatus, a video game console, a cellular or satellite radio phone, a video conference apparatus, or a video stream apparatus. These digital video apparatuses implement video compression technologies, for example, those video compression technologies described in standards defined by moving picture experts group (MPEG)-2, MPEG-4, international telecommunication union (ITU) telecommunication standardization sector (ITU-T) H.263, ITU-T H.264/MPEG-4 Part 10 advanced video coding (AVC), and ITU-T H.265 HEVC and extensions of the standards, to transmit and receive digital video information more efficiently. The video apparatus may transmit, receive, encode, decode, and/or store the digital video information more efficiently by implementing these video coding/decoding technologies.

In the video coding/decoding field, a concept of a frame refers to a complete image, and a plurality of image frames constitute a video format in a specific sequence at a frame rate for playback. After the frame rate reaches a specific speed, a time interval between two frames is less than a resolution limit of human eyes, and a transitory visual stay appears such that seemingly dynamic playback may be performed on a screen. A video file may be compressed based on compression coding of a single-frame digital image, and a digitized image includes a large amount of repeated representation information, which is referred to as redundancy information. An image frame usually includes many same or similar spatial structures. For example, most of sampling points of a same object or in a same background are closely associated and similar in terms of colors. In a multi-frame image group, an image frame is greatly correlated with a previous frame or a next frame of the image frame, pixel values used for describing information are slightly different, and these pixel values all may be compressed. Similarly, the video file not only includes spatial redundancy information, but also includes a large amount of temporal redundancy information. This is caused by a video composition structure. For example, a video sampling frame rate is usually 25 frames per second to 30 frames per second, and may be 60 frames per second in a special case. That is, a sampling time interval between two adjacent frames is at least 1/30 second to 1/25 second. In such a short time, a large amount of similar information basically exists in all images obtained through sampling, and the images are greatly correlated. However, the images are independently recorded in an original digital video entry system without considering and using these coherent and similar features. Consequently, a relatively large amount of repeated and redundant data is generated. In addition, researches show that, from a perspective of a psychological feature of visual sensitivity of the human eyes, video information may also include a part that can be used for compression, that is, visual redundancy. The visual redundancy indicates that a video bit stream is appropriately compressed using a feature that the human eyes are relatively sensitive to a luminance change and relatively insensitive to a chrominance change. In a high-luminance area, sensitivity of human vision to luminance changes tends to decrease, and the human eye is relatively insensitive to an internal area of an object and a change of internal details, instead, the human eye is relatively sensitive to an edge and an overall structure of the object. Because video image information finally serves a human group, these features of the human eyes can be fully used to compress original video image information to achieve a better compression effect. In addition to the spatial redundancy, temporal redundancy, and visual redundancy mentioned above, the video image information further includes a series of redundancy information such as information entropy redundancy, structural redundancy, knowledge redundancy, and importance redundancy. Video compression coding is to remove redundancy information in a video sequence using various technical methods to reduce storage space and save a transmission bandwidth.

In terms of a current technology development status, video compression technologies mainly include intra-frame prediction, inter prediction, transform, and quantization, entropy encoding, de-blocking filtering, and the like. Within an international general scope, video compression coding standards mainly include four mainstream compression coding schemes chrominance sampling, predictive coding, transform coding, and quantization coding.

During the chrominance sampling, psychological visual features of the human eyes are fully used, and an amount of data described using a single element attempts to be minimized to a full extent from underlying data. Luminance-chrominance-chrominance (YUV) color encoding is performed in most television systems, and is a standard widely used in the European television system. YUV color space includes one luminance signal Y and two chroma difference signals U and V, and the three components are independent of each other. Compared with a conventional red-green-blue (RGB) color mode, a YUV color mode has more advantages. A separation representation manner is more flexible, and smaller bandwidth is occupied for transmission. For example, a form of YUV 4:2:0 indicates that the two chrominance components U and V are only a half of the luminance component Y in both a horizontal direction and a vertical direction. That is, four sampling pixels include four luminance components Y, only one chrominance component U, and only one chrominance component V. Such a representation manner indicates that the data amount is further reduced to only 33% of an original data amount approximately. The chrominance sampling manner of implementing video compression using physiological visual features of the human eyes is one of currently widely used video data compression manners.

The predictive coding indicates that data information of a previously encoded frame is used to predict a frame to be encoded currently. A predictor is obtained through prediction. The predictor is not completely equal to an actual value, and there is a specific residual between the predictor and the actual value. If prediction is performed more appropriately, the predictor is more approximate to the actual value, and the residual is smaller. Therefore, a data amount can be greatly reduced by encoding the residual. On a decoder side, an initial image is restored and reconstructed by adding the residual to the predictor during decoding. This is a basic method of thinking for predictive coding. In mainstream coding standards, predictive coding is classified into two basic types, intra-frame prediction and inter prediction.

During transform coding, original space domain information is not directly encoded, and instead, an information sampling value is transformed from a current domain to another artificially defined domain (usually referred to as a transform domain) based on a transform function in a specific form, and then compression coding is performed based on a distribution feature of the information in the transform domain. A reason for transform coding is as follows. Video image data is usually greatly correlated in space domain, and consequently a large amount of redundancy information exists, and a large quantity of bits is required for direct encoding. However, a data correlation is greatly reduced in transform domain such that an amount of redundancy information for encoding is reduced, and an amount of data required for encoding is greatly reduced accordingly. Therefore, a relatively high compression ratio can be obtained, and a better compression effect can be implemented. Typical transform coding includes Carlo (K-L) transform, Fourier transform, and the like. Integer discrete cosine transform (DCT) is a common transform coding scheme in many international standards.

Quantization coding indicates that a quantization process is a powerful method for data compression and is also a main cause of a data "loss" in lossy compression because data is not actually compressed in the foregoing transform coding. The quantization process is a process in which an input value with a relatively large dynamic range is forcibly planned to an output value with a relatively small dynamic range. A quantization input value has a relatively large range, and therefore needs to be represented using a relatively large quantity of bits. However, an output value obtained after "forcibly planning" has a relatively small range, and therefore only needs to be represented using a small quantity of bits. Each quantization input is normalized to one quantization output. That is, each quantization input is quantized to a specific order of magnitude, and the order of magnitude is usually referred to as a quantization level (which is usually specified by an encoder).

In a coding algorithm based on a hybrid coding architecture, the foregoing compression coding schemes are used in a hybrid manner, and an encoder control module selects, based on local features of different image blocks in a video frame, encoding modes used for the image blocks. Frequency domain prediction or space domain prediction is performed on an intra-frame prediction code block, motion compensation prediction is performed on an inter prediction code block, then a predicted residual is transformed and quantized to form a residual coefficient, and finally, a final code stream is generated using an entropy encoder. To avoid accumulation of prediction errors, an intra-frame prediction reference signal or inter prediction reference signal is obtained using a decoding module on an encoder side. The residual coefficient obtained after the transform and the quantization is dequantized and inversely transformed to reconstruct a residual signal, and then the residual signal is added to a predicted reference signal to obtain a reconstructed image.

In most coding frameworks, a video sequence includes a series of images/picture, the image is further divided into slices, and the slice is further divided into blocks. Using a block as a unit, video coding may be performed, starting from a top-left position of the picture, row by row from left to right and from top to bottom. In some new video coding standards, a concept of block is further extended. A macroblock (MB) exists in the H.264 standard, and the MB may be further divided into a plurality of prediction blocks (that is, partition) that may be used for predictive coding.

In the HEVC standard, there are a plurality of units in terms of function division such as a CU, a prediction unit (also referred to as PU), and a transform unit (also referred to as TU), and a radically new tree-based structure is used for description. For example, the CU may be divided into smaller CUs based on a quadtree, the smaller CU may be further divided, and therefore a quadtree structure is formed. Similar tree structures also exist for the PU and the TU. The CU, the PU, and the TU all belong to a concept of block in essence. The CU is similar to a MB or a code block, and is a basic unit for dividing and encoding a coding image. The PU may correspond to a prediction block, and is a basic unit for predictive coding. The CU is further divided into a plurality of PUs based on a division mode. The TU may correspond to a transform block, and is a basic unit for transforming a prediction residual. In the HEVC standard, the units may be collectively referred to as a code tree block (CTB) or the like.

Figure 1B:
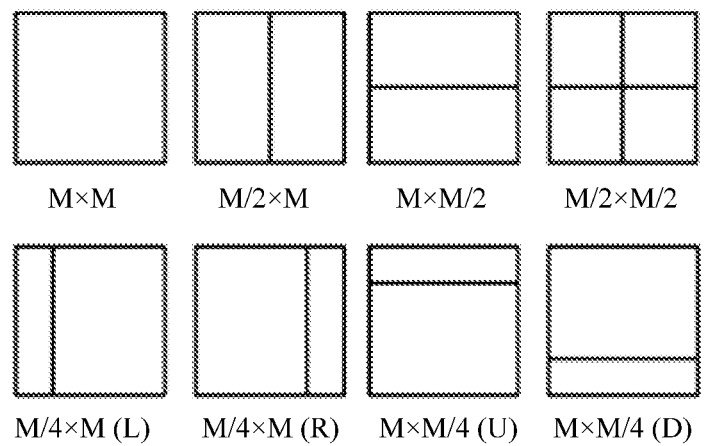

In the HEVC standard, there may be several size levels of code units such as 64×64, 32×32, 16×16, and 8×8, and a code unit at each level may be further divided into prediction units of different sizes based on intra-frame prediction and inter prediction. For example, as shown in FIG. 1A and FIG. 1B, FIG. 1A illustrates, using an example, a prediction unit division manner corresponding to intra-frame prediction, and FIG. 1B illustrates, using an example, several prediction unit division manners corresponding to inter prediction.

Figure 1C:
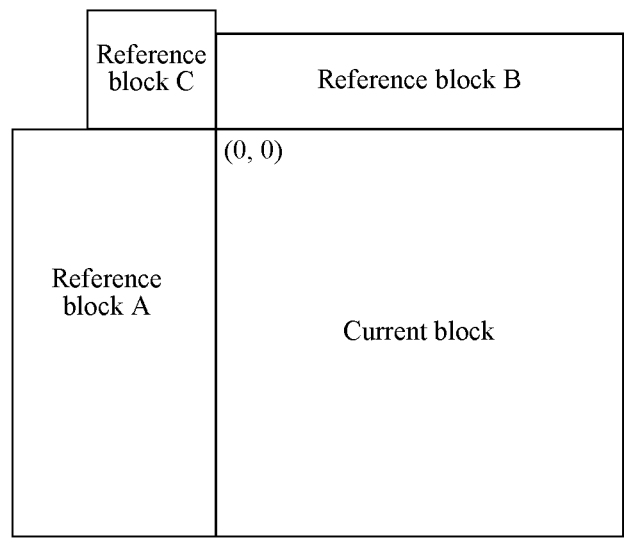
FIG. 1C is a schematic diagram of locations of several possible adjacent reference blocks of a current block according to an embodiment of this application.

The solution of this application is mainly for an intra-frame prediction scenario. FIG. 1C shows several possible adjacent reference blocks of a current block, a reference block A is a left adjacent reference block of the current block, a reference block B is a top-left adjacent reference block of the current block, and a reference block C is a top adjacent reference block of the current block.

In some technical solutions, the image prediction method may include performing intra-frame prediction on a current block using a reference block to obtain an initial predicted pixel value of a pixel in the current block, and performing weighted filtering on the initial predicted pixel value of the pixel in the current block using the following weighted filtering formulas to obtain a predicted pixel value of the pixel in the current block.

$$p''[x, y] = \begin{cases} (c_{top} \gg [y/d])r[x, -1] - (c_{topleft} \gg [x/d])r[-1, -1] + \\ (c_{left} \gg [x/d])r[-1, y] + c_{cur}p'[x, y] + 32 \end{cases} \gg 6 \quad \text{(Formula 1)}$$

$$\text{and } c_{cur} = 64 - (c_{top} \gg [y/d]) - (c_{left} \gg [x/d]) + (c_{topleft} \gg [x/d]). \quad \text{(Formula 2)}$$

Formula 1 is a possible weighted filtering formula, and ">>" indicates a shift operator.

In Formula 1, $c_{top}$ represents a weighting coefficient corresponding to a reconstructed pixel value of a top adjacent reference block of the current block, $c_{left}$ represents a weighting coefficient corresponding to a reconstructed pixel value of a left adjacent reference block of the current block, $c_{topleft}$ represents a weighting coefficient corresponding to a reconstructed pixel value of a top-left adjacent reference block of the current block, x represents a horizontal coordinate of a pixel in the current block relative to a top-left vertex of the current block, y represents a vertical coordinate of the pixel in the current block relative to the top-left vertex of the current block, where coordinates of the top-left vertex of the current block are, for example, [0, 0], p''[x, y] represents a predicted pixel value of a pixel whose coordinates are [x, y] in the current block, p'[x, y] represents an initial predicted pixel value of the pixel whose coordinates are [x, y] in the current block, r[x, −1] represents a reconstructed pixel value of a pixel whose coordinates are [x, −1]

in the top adjacent reference block of the current block, r[−1, −1] represents a reconstructed pixel value of a pixel whose coordinates are [−1, −1] in the top-left adjacent reference block of the current block, and r[−1, y] represents a reconstructed pixel value of a pixel whose coordinates are [−1, y] in the left adjacent reference block of the current block.

Weighting coefficients used for the weighted filtering include a horizontal weighting coefficient and a vertical weighting coefficient. The horizontal weighting coefficient includes $c_{top}$. The vertical weighting coefficients include $c_{left}$ and $c_{topleft}$. Herein, d represents an attenuation rate factor. Because d acts on both the horizontal weighting coefficient and the vertical weighting coefficient, an attenuation rate factor acting on the horizontal weighting coefficient is equal to an attenuation rate factor acting on the vertical weighting coefficient in Formula 1 and Formula 2. According to a position dependent intra prediction combination (PDPC) algorithm principle, a correlation between adjacent pixels needs to be reflected in a weighted filtering formula, and the correlation is approximately attenuated exponentially as a distance between the two pixels increases. For example, ">>[y/d]" and ">>[x/d]" in Formula 1 reflect attenuation features. Further, for example, two pixels whose coordinates are (0, 0) and (0, −1) are adjacent to each other. Therefore, $c_{top}$ is not downscaled according to Formula 1 such that a result of predicting the pixel whose coordinates are (0, 0) is greatly affected by r (0, −1).

Figure 1D:
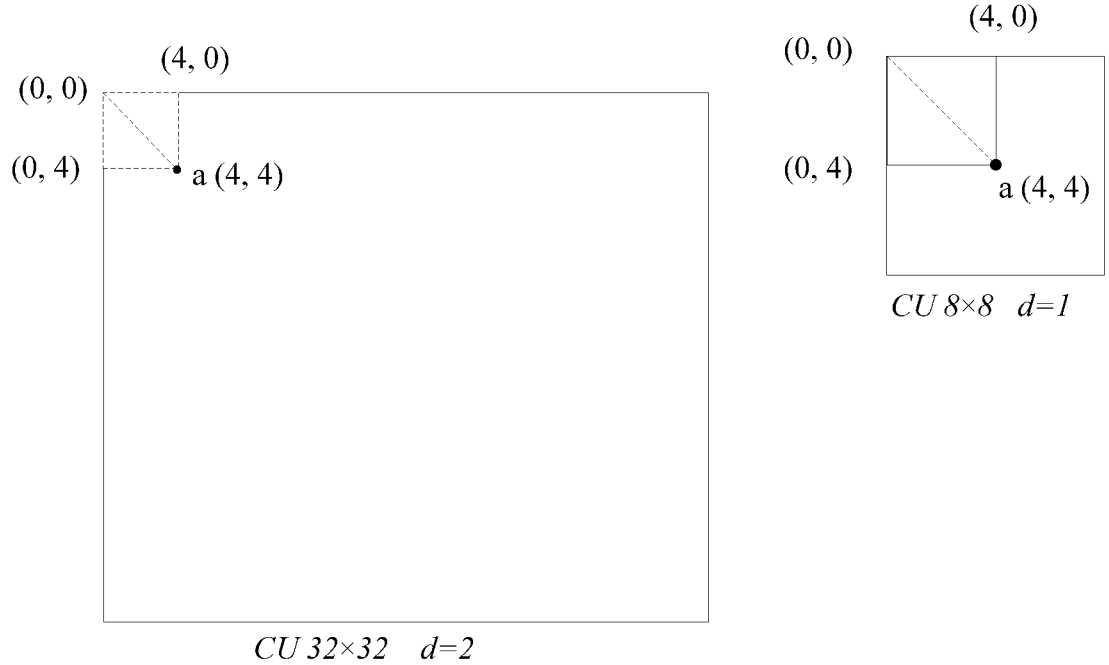
FIG. 1D, FIG. 1E, FIG. 1F, and FIG. 1G are schematic diagrams of values of attenuation rate factors of image blocks of several example sizes according to an embodiment of this application.

A value of the attenuation rate factor d reflects an attenuation rate. As shown in FIG. 1D, when the current block is of a 32×32 size, d=2, and coefficients $c_{top}$ and $c_{left}$ of a predicted pixel a whose coordinates are (4, 4) are attenuated by four times relative to the top-left vertex. When the current block is of an 8×8 size, d=1, and coefficients $c_{top}$ and $c_{left}$ of a predicted pixel a whose coordinates are (4, 4) are attenuated by 16 times relative to the top-left vertex. The pixel a is close to a top-left position of a 32×32 CU and is in a center of an 8×8 CU, and a degree at which the pixel a is adjacent to the pixel whose coordinates are (0, 0) is relatively reduced. It can be learned from the foregoing analysis that coefficient attenuation of a CU having a relatively large side length (for example, the side length>32) is slower than that of a CU having a relatively small side length.

A quadtree plus binary tree (QTBT) method is proposed and features of the QTBT method are as follows. A non-square CU of a length and a width that are not equal is allowed to exist, and a side length of the CU ranges from 4 to 128.

To adapt to the QTBT method, the value of the attenuation rate factor d is further adjusted in the PDPC.

Figure 1E:
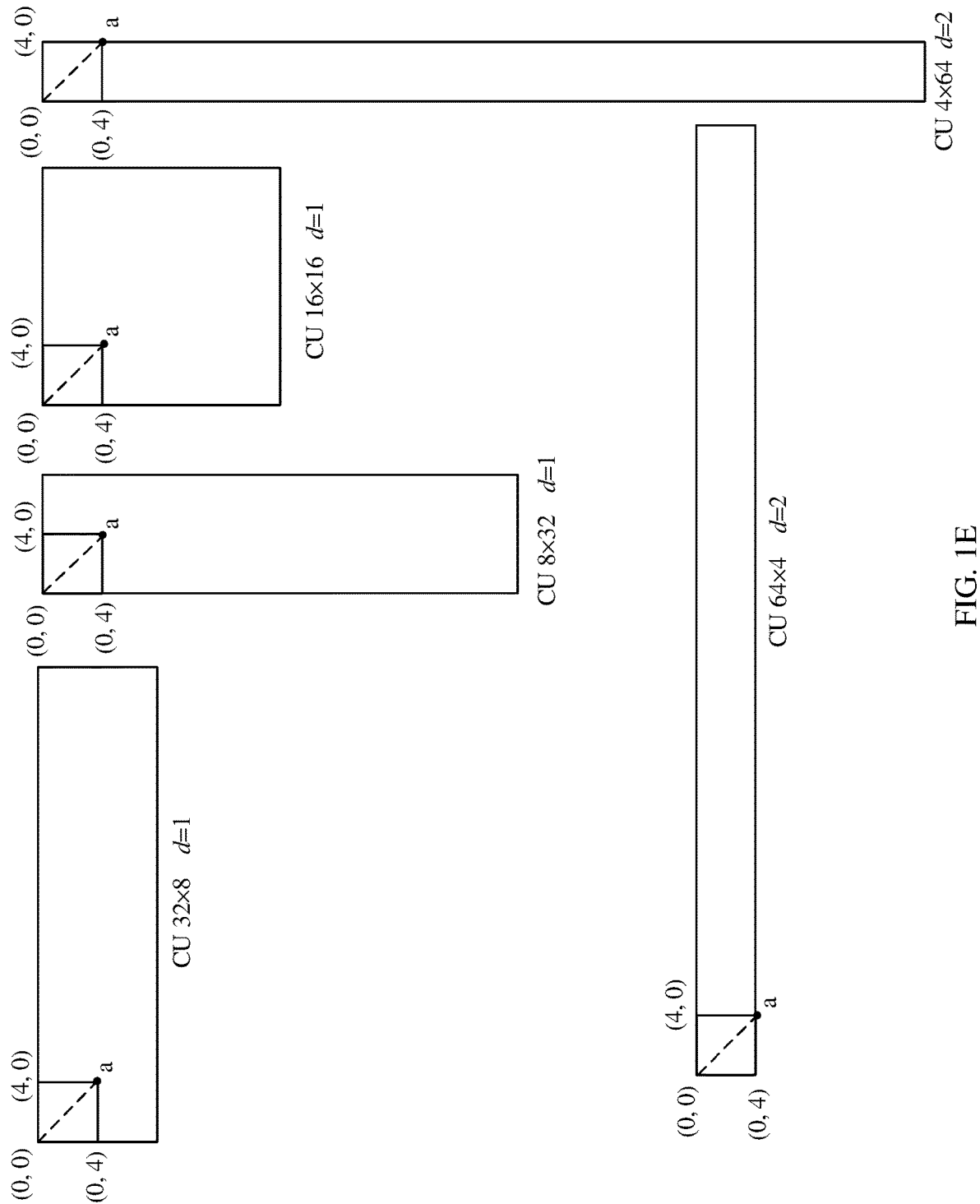

In a possible implementation, when a CU is divided using the QTBT method, the value of the attenuation rate factor d depends on a sum of a length and a width of the CU. For example, when the sum of the length and the width is less than 64, d=1, or when the sum of the length and the width is greater than or equal to 64, d=2. It is learned, through research, that some problems exist in the solution in which the value of the attenuation rate factor d depends on a sum of a length and a width of the CU. For example, when sums of lengths and widths of CUs of different shapes are the same, values of d are the same, and consequently d is weakly correlated with a CU shape. As shown in FIG. 1E, for CUs of three sizes and shapes 32×8, 8×32, and 16×16, values of d are all 1. For another example, for a CU with a large ratio of a length to a width, values of d corresponding to the length and the width are the same. That is, d is weakly correlated with the length and the width of the CU. As shown in FIG. 1E, although a ratio of a length to a width of a CU of 8×32 or 32×8 reaches 1:4 or 4:1, coefficient attenuation rates of the length and the width are considered to be consistent because the value of d is 1. Although a ratio of a length to a width of a CU of 4×64 or 64×4 reaches 1:8 or 8:1, coefficient attenuation rates of the length and the width are considered to be consistent because the value of d is 2.

In the foregoing enumerated solutions, in any case, the attenuation rate factor acting on the horizontal weighting coefficient is equal to the attenuation rate factor acting on the vertical weighting coefficient such that there is a relatively large deviation between an attenuation rate reflected in the weighted filtering formula and an actual attenuation rate in some cases. Therefore, image prediction accuracy is reduced, and system coding/decoding performance may be greatly affected.

The following continues to discuss other technical solutions.

Figure 2:
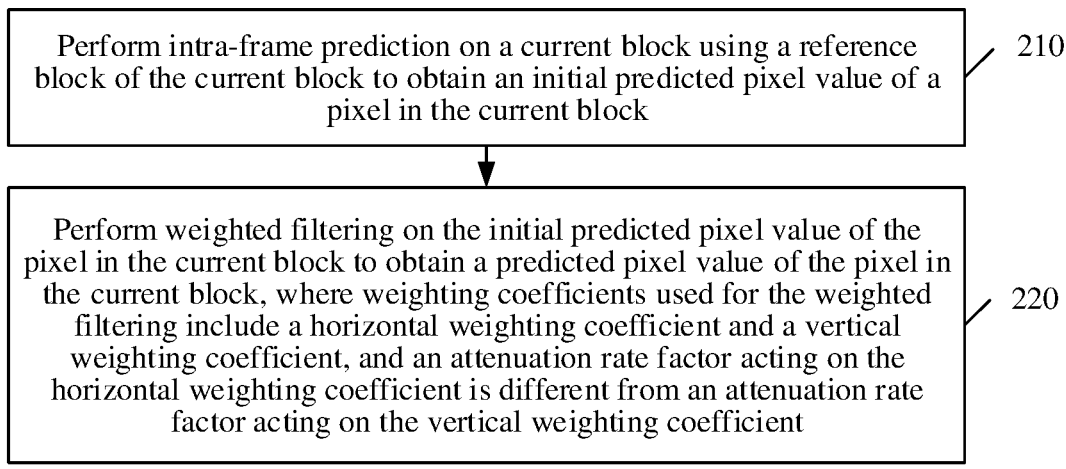
FIG. 2 is a schematic flowchart of an image prediction method according to an embodiment of this application.

FIG. 2 is a schematic flowchart of an image prediction method according to an embodiment of this application. The image prediction method may be applied to a video coding process or a video decoding process. The image prediction method may include but is not limited to the following steps.

Step 210. Perform intra-frame prediction on a current block using a reference block of the current block to obtain an initial predicted pixel value of a pixel in the current block.

The intra-frame prediction is, for example, directional intra-frame prediction, direct current coefficient intra-frame prediction, interpolation intra-frame prediction, or another intra-frame prediction method.

It can be understood that there may be various manners of performing intra-frame prediction on the current block using the reference block.

Further, for example, the performing intra-frame prediction on a current block using a reference block to obtain an initial predicted pixel value of a pixel in the current block includes filtering a reconstructed pixel value of a reference pixel in the reference block to obtain a filtered pixel value of the reference pixel in the reference block, and performing intra-frame prediction on the current block using the filtered pixel value of the reference pixel in the reference block, to obtain the initial predicted pixel value of the pixel in the current block.

For another example, performing intra-frame prediction on a current block using a reference block to obtain an initial predicted pixel value of a pixel in the current block includes performing intra-frame prediction on the current block using a reconstructed pixel value of a reference pixel in the reference block to obtain the initial predicted pixel value of the pixel in the current block.

Step 220. Perform weighted filtering on the initial predicted pixel value of the pixel in the current block to obtain a predicted pixel value of the pixel in the current block, where weighting coefficients used for the weighted filtering include a horizontal weighting coefficient and a vertical weighting coefficient, and an attenuation rate factor acting on the horizontal weighting coefficient is different from an attenuation rate factor acting on the vertical weighting coefficient.

Further, for example, when a difference between a horizontal texture feature and a vertical texture feature of the current block exceeds a difference threshold, the attenuation rate factor acting on the horizontal weighting coefficient is different from the attenuation rate factor acting on the vertical weighting coefficient.

For another example, when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

It can be understood that, when the difference between the horizontal texture feature and the vertical texture feature of the current block cannot be learned of in advance, the difference between the horizontal texture feature and the vertical texture feature of the current block may be first determined, and then the attenuation rate factor acting on the horizontal weighting coefficient and the attenuation rate factor acting on the vertical weighting coefficient are determined based on the determined difference between the horizontal texture feature and the vertical texture feature of the current block.

Certainly, if the difference between the horizontal texture feature and the vertical texture feature of the current block is known and determined in advance (for example, assuming that a texture feature is a side length, and the current block is obtained through division in a specific division manner, a shape and a size of the current block are a known and determined parameter, and therefore a difference between a length and a width of the current block is a known and determined parameter), it may be alternatively considered that the attenuation rate factor acting on the horizontal weighting coefficient and the attenuation rate factor acting on the vertical weighting coefficient are correspondingly determined such that the step in which "the difference between the horizontal texture feature and the vertical texture feature of the current block is first determined, and then the attenuation rate factor acting on the horizontal weighting coefficient and the attenuation rate factor acting on the vertical weighting coefficient are determined based on the determined difference between the horizontal texture feature and the vertical texture feature of the current block" does not need to be performed.

That is, when it is known and determined that "the difference between the horizontal texture feature and the vertical texture feature of the current block exceeds the difference threshold" or "the difference between the horizontal texture feature and the vertical texture feature of the current block does not exceed the difference threshold", the attenuation rate factor acting on the horizontal weighting coefficient and the attenuation rate factor acting on the vertical weighting coefficient may be correspondingly selected directly based on a current known and determined case without a need of determining a condition of "whether the difference between the horizontal texture feature and the vertical texture feature of the current block exceeds the difference threshold".

It can be understood that, if the difference between the horizontal texture feature and the vertical texture feature of the current block exceeds the difference threshold, it indicates that the difference between the horizontal texture feature and the vertical texture feature of the current block is relatively large, and this difference needs to be considered. If the difference between the horizontal texture feature and the vertical texture feature of the current block does not exceed the difference threshold, it indicates that the difference between the horizontal texture feature and the vertical texture feature of the current block is relatively small, and this difference may be allowed to be ignored.

For example, the attenuation rate factor acting on the horizontal weighting coefficient and the attenuation rate factor acting on the vertical weighting coefficient may be determined based on the difference between the horizontal texture feature and the vertical texture feature of the current block.

The texture feature may include, for example, the side length, an auto variance, and/or edge acutance. Therefore, the horizontal texture feature may include a horizontal side length (that is length), a horizontal auto variance, horizontal edge acutance, and/or the like, and the vertical texture feature may include a vertical side length (that is width), a vertical auto variance, vertical edge acutance, and/or the like.

For example, when the texture feature is the side length, and when a difference between a length and a width of the current block exceeds the difference threshold, and the length of the current block is greater than the width, the attenuation rate factor acting on the horizontal weighting coefficient is greater than the attenuation rate factor acting on the vertical weighting coefficient. When the difference between the length and the width of the current block exceeds the difference threshold, and the length of the current block is less than the width, the attenuation rate factor acting on the horizontal weighting coefficient is less than the attenuation rate factor acting on the vertical weighting coefficient.

For another example, when the texture feature is the auto variance, and when a difference between a horizontal auto variance and a vertical auto variance of the current block exceeds the difference threshold, and the horizontal auto variance of the current block is greater than the vertical auto variance, the attenuation rate factor acting on the horizontal weighting coefficient is greater than the attenuation rate factor acting on the vertical weighting coefficient. When the difference between the horizontal auto variance and the vertical auto variance of the current block exceeds the difference threshold, and the horizontal auto variance of the current block is less than the vertical auto variance, the attenuation rate factor acting on the horizontal weighting coefficient is less than the attenuation rate factor acting on the vertical weighting coefficient.

For another example, when the texture feature is the edge acutance, and when a difference between horizontal edge acutance and vertical edge acutance of the current block exceeds the difference threshold, and the horizontal edge acutance of the current block is greater than the vertical edge acutance, the attenuation rate factor acting on the horizontal weighting coefficient is greater than the attenuation rate factor acting on the vertical weighting coefficient. When the difference between the horizontal edge acutance and the vertical edge acutance of the current block exceeds the difference threshold, and the horizontal edge acutance of the current block is less than the vertical edge acutance, the attenuation rate factor acting on the horizontal weighting coefficient is less than the attenuation rate factor acting on the vertical weighting coefficient.

It can be understood that an attenuation rate factor reflects, to some extent, an attenuation rate of a weighting coefficient on which the attenuation rate factor acts. Different attenuation rate factors may bring different attenuation rates of weighting coefficients on which the different attenuation rate factors act. Whether the attenuation rate factor acting on the horizontal weighting coefficient is the same as the attenuation rate factor acting on the vertical weighting coefficient mainly depends on the difference between the horizontal texture feature and the vertical texture feature of the current block.

For example, performing weighted filtering on the initial predicted pixel value of the pixel in the current block to obtain a predicted pixel value of the pixel in the current block may include performing weighted filtering on the initial predicted pixel value of the pixel in the current block according to the following weighted filtering formulas to obtain the predicted pixel value of the pixel in the current block:

$$p''[x, y] = \begin{Bmatrix} (c_{top} \gg [y/d_2])r[x, -1] - (c_{topleft} \gg [x/d_1])r[-1, -1] + \\ (c_{left} \gg [x/d_1])r[-1, y] + c_{cur}p'[x, y] + 32 \end{Bmatrix} \gg 6$$

(Formula 3)

and $c_{cur} = 64 - (c_{top} \gg [y/d_2]) - (c_{left} \gg [x/d_1]) + (c_{topleft} \gg [x/d_1])$, (Formula 4)

where Formula 3 is a weighted filtering formula, and ">>" indicates a shift operator, $c_{top}$ is a horizontal weighting coefficient, and $c_{left}$ and $c_{topleft}$ are vertical weighting coefficients, $c_{top}$ represents a weighting coefficient corresponding to a reconstructed pixel value of a top adjacent reference block of the current block, $c_{left}$ represents a weighting coefficient corresponding to a reconstructed pixel value of a left adjacent reference block of the current block, $c_{topleft}$ represents a weighting coefficient corresponding to a reconstructed pixel value of a top-left adjacent reference block of the current block, x represents a horizontal coordinate of a pixel in the current block relative to a top-left vertex of the current block, and y represents a vertical coordinate of the pixel in the current block relative to the top-left vertex of the current block, and $d_1$ is the attenuation rate factor acting on the horizontal weighting coefficient, $d_2$ is the attenuation rate factor acting on the vertical weighting coefficient, $d_1$ and $d_2$ are real numbers, p"[x, y] represents a predicted pixel value of a pixel whose coordinates are [x, y] in the current block, p'[x, y] represents an initial predicted pixel value of the pixel whose coordinates are [x, y] in the current block, r[x, −1] represents a reconstructed pixel value of a pixel whose coordinates are [x, −1] in the top adjacent reference block of the current block, r[−1, −1] represents a reconstructed pixel value of a pixel whose coordinates are [−1, −1] in the top-left adjacent reference block of the current block, and r[−1, y] represents a reconstructed pixel value of a pixel whose coordinates are [−1, Y] in the left adjacent reference block of the current block.

It can be understood that a value of the attenuation rate factor acting on the horizontal weighting coefficient and a value of the attenuation rate factor acting on the vertical weighting coefficient mainly depend on the difference between the horizontal texture feature and the vertical texture feature of the current block, and there may be various specific correspondences between the attenuation rate factors and the difference. When the difference between the horizontal texture feature and the vertical texture feature of the current block exceeds the difference threshold, $d_1$ is not equal to $d_2$, or when the difference between the horizontal texture feature and the vertical texture feature of the current block does not exceed the difference threshold, $d_1$ is equal to $d_2$.

The following uses a case in which the texture feature includes the side length as an example.

For example, when a length of the current block is greater than a threshold thresh2, $d_1$=2, or when the length of the current block is less than or equal to the threshold thresh2, $d_1$=1, where thresh2 is a real number greater than or equal to 16. For example, thresh2 is equal to 16, 17, 32, 64, 128, or another value.

For another example, when a width of the current block is greater than a threshold thresh3, $d_2$=2, or when the width of the current block is less than or equal to the threshold thresh3, $d_2$=1, where thresh3 is a real number greater than or equal to 16. For example, thresh3 is equal to 16, 18, 32, 64, 128, or another value.

Figure 1F:
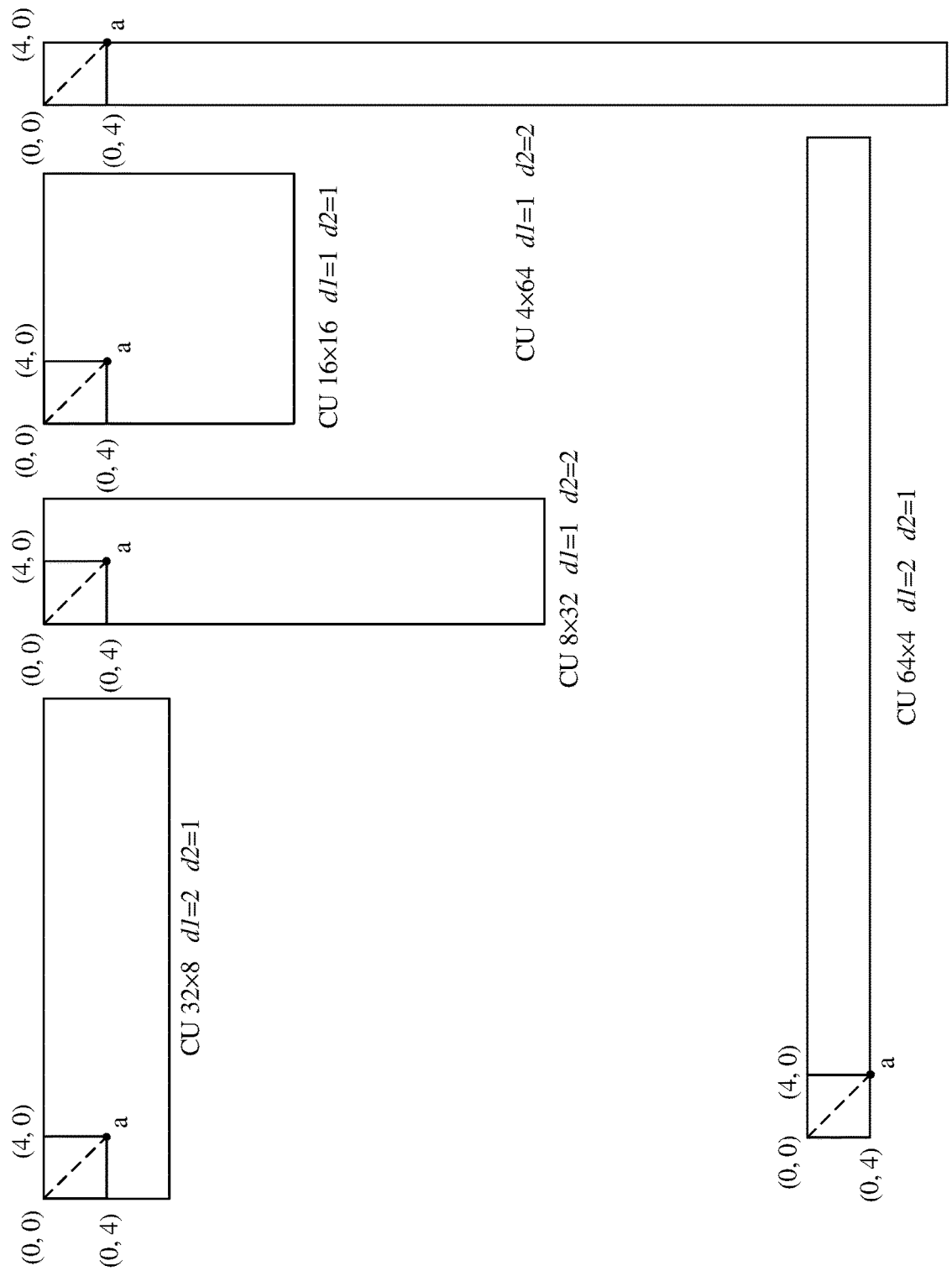

For example, details are shown in FIG. 1F. An example in which thresh2 and thresh3 are equal to 16 is used in FIG. 1F. When the current block is of a 32×8 size or a 64×4 size, $d_1$=2, $d_2$=1 When the current block is of a 16×16 size, $d_1$=1, $d_2$=. When the current block is of an 8×32 size or a 4×64 size, d=1, $d_2$=2 After the settings, for the current block of the 32×8 size or the 64×4 size, an attenuation rate of the vertical weighting coefficient ($c_{top}$) is two times greater than that of the horizontal weighting coefficient ($c_{left}$ or $c_{topleft}$). For the current block of the 8×32 size or the 4×64 size, the attenuation rate of the vertical weighting coefficient ($c_{top}$) is a half of that of the horizontal weighting coefficient ($c_{left}$ or $c_{topleft}$). For the current block of the 16×16 size, $d_1$=$d_2$=1, and $c_{top}$, $c_{left}$, and $c_{topleft}$ have a same attenuation rate. It can be learned that in the example scenarios, a coefficient attenuation rate may be adaptively changed based on a length-width ratio, a shape, and the like of an image block.

For another example, when the texture feature includes the side length, the difference threshold includes a threshold thresh1, and a ratio of a length to a width of the current block is greater than the threshold thresh1, for example, $d_1$=1, and $d_2$=2, and when a ratio of the width to the length of the current block is greater than the threshold thresh1, for example, $d_1$=2, and $d_2$=1, where thresh1 is a real number greater than 2. For example, thresh1 is equal to 2.5, 4, 6, 8, 16, 32, or another value.

Further, when the ratio of the length to the width of the current block is less than the threshold thresh1, the length of the current block is greater than or equal to the width, and when a sum of the length and the width of the current block is greater than a threshold thresh4, $d_1$=$d_2$=2, and/or when the ratio of the length to the width of the current block is less than the threshold thresh1, the length of the current block is greater than or equal to the width, and the sum of the length and the width of the current block is less than or equal to the threshold thresh4, $d_1$=$d_2$=1.

Herein, thresh4 is a real number greater than or equal to 64. For example, thresh4 is equal to 64, 65, 80, 96, 128, or another value.

Figure 1G:
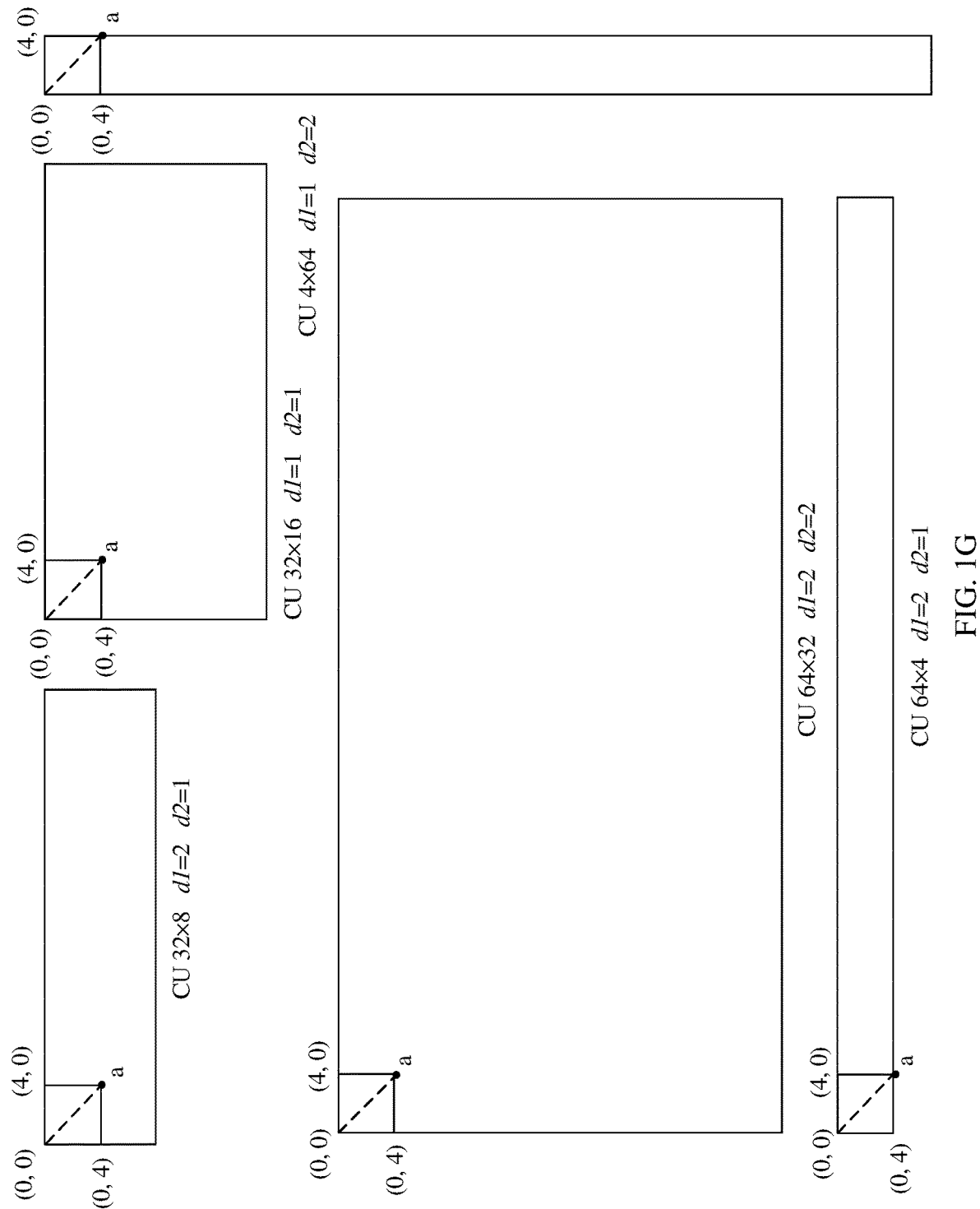

For example, details are shown in FIG. 1G. An example in which thresh1 is equal to 4 and thresh4 is equal to 64 is used in FIG. 1G. When the current block is of a 32×8 size or a 64×4 size, d=2, $d_2$=1. When the current block is of a 32×16 size, d=$d_2$=1. When the current block is of a 64×32 size, $d_1$=$d_2$=2. After the settings, for the current block of the 32×8 size or the 64×4 size, an attenuation rate of the vertical weighting coefficient ($c_{top}$) is two times greater than that of the horizontal weighting coefficient ($c_{left}$ or $c_{topleft}$). For the current block of the 32×16 size or the 64×32 size, $c_{top}$, $c_{left}$, and $c_{topleft}$ have a same attenuation rete. It can be learned that in the example scenarios, a coefficient attenuation rate may be adaptively changed based on a length-width ratio, a shape, and the like of an image block.

It can be understood that FIG. 1F and FIG. 1G are only some possible example implementations. Certainly, this embodiment is not limited to such an example implementation in actual application.

It can be learned that, in the foregoing technical solution, the weighting coefficients used to perform weighted filtering on the initial predicted pixel value of the pixel in the current block include the horizontal weighting coefficient and the vertical weighting coefficient, and different attenuation rate factors are set for the vertical weighting coefficient and the horizontal weighting coefficient. That is, the attenuation rate factor acting on the horizontal weighting coefficient may be different from the attenuation rate factor acting on the vertical weighting coefficient. Therefore, this helps differentially control attenuation rates of the vertical weighting coefficient and the horizontal weighting coefficient, further helps meet a requirement in some scenarios in which the vertical weighting coefficient and the horizontal weighting coefficient need to be attenuated at different attenuation rates, and helps improve image prediction accuracy because flexibility of controlling the attenuation rates of the vertical weighting coefficient and the horizontal weighting coefficient is improved. For example, when the difference between the horizontal texture feature and the vertical texture feature of the current block exceeds the difference threshold, a weighting coefficient attenuation rate difference better matches a texture feature difference, thereby helping improve the image prediction accuracy.

Figure 3:
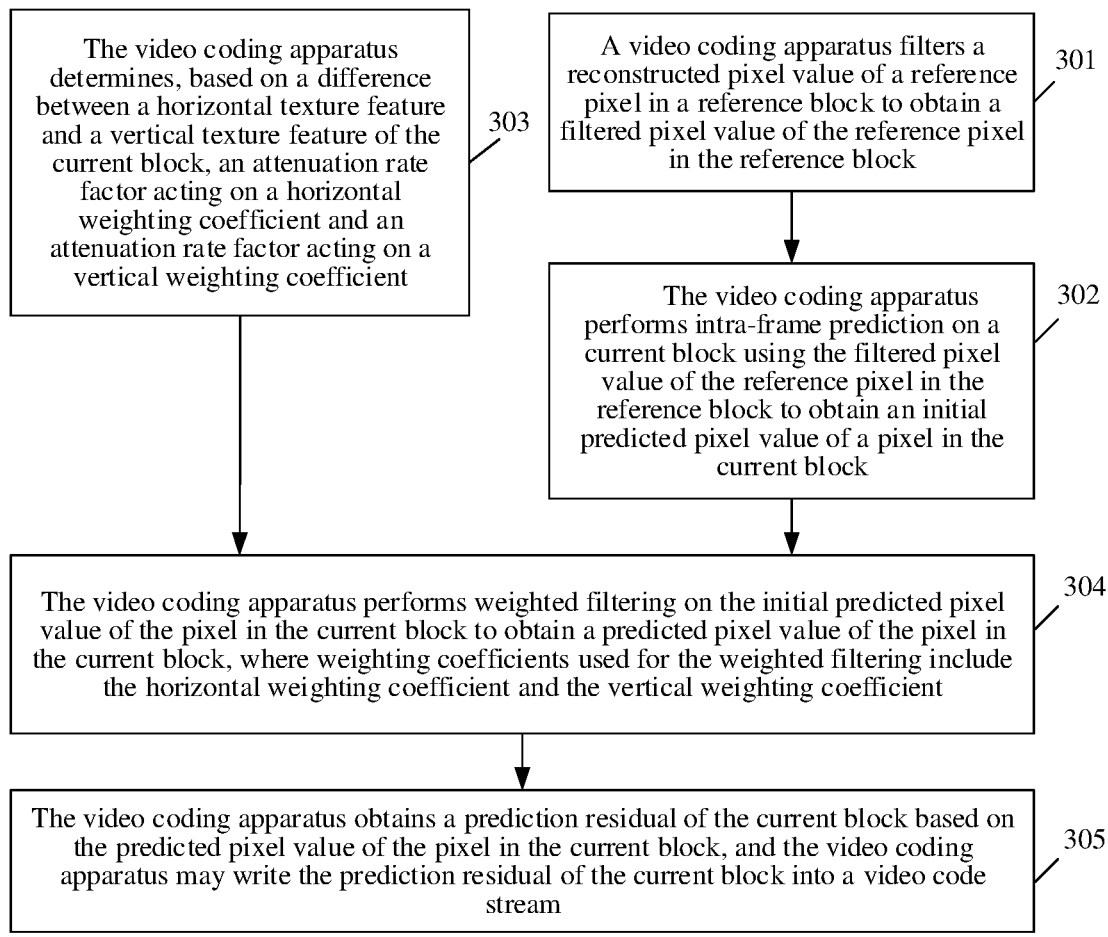
FIG. 3 is a schematic flowchart of an image encoding method according to an embodiment of this application.

FIG. 3 is a schematic flowchart of a video coding method according to another embodiment of this application. The video coding method may include but is not limited to the following steps.

Step 301. A video coding apparatus filters a reconstructed pixel value of a reference pixel in a reference block to obtain a filtered pixel value of the reference pixel in the reference block.

Step 302. The video coding apparatus performs intra-frame prediction on a current block using the filtered pixel value of the reference pixel in the reference block to obtain an initial predicted pixel value of a pixel in the current block.

The intra-frame prediction is, for example, directional intra-frame prediction, direct current coefficient intra-frame prediction, interpolation intra-frame prediction, or another intra-frame prediction method.

Step 303. The video coding apparatus determines, based on a difference between a horizontal texture feature and a vertical texture feature of the current block, an attenuation rate factor acting on a horizontal weighting coefficient and an attenuation rate factor acting on a vertical weighting coefficient.

It can be understood that, when the difference between the horizontal texture feature and the vertical texture feature of the current block cannot be learned of in advance, the difference between the horizontal texture feature and the vertical texture feature of the current block may be first determined, and then the attenuation rate factor acting on the horizontal weighting coefficient and the attenuation rate factor acting on the vertical weighting coefficient are determined based on the determined difference between the horizontal texture feature and the vertical texture feature of the current block.

Certainly, if the difference between the horizontal texture feature and the vertical texture feature of the current block is known and determined in advance (for example, assuming that a texture feature is a side length, and the current block is obtained through division in a specific division manner, a shape and a size of the current block are a known and determined parameter, and therefore a difference between a length and a width of the current block is a known and determined parameter), it may be alternatively considered that the attenuation rate factor acting on the horizontal weighting coefficient and the attenuation rate factor acting on the vertical weighting coefficient are correspondingly determined such that the step in which "the difference between the horizontal texture feature and the vertical texture feature of the current block is first determined, and then the attenuation rate factor acting on the horizontal weighting coefficient and the attenuation rate factor acting on the vertical weighting coefficient are determined based on the determined difference between the horizontal texture feature and the vertical texture feature of the current block" does not need to be performed.

That is, when it is known and determined that "the difference between the horizontal texture feature and the vertical texture feature of the current block exceeds a difference threshold" or "the difference between the horizontal texture feature and the vertical texture feature of the current block does not exceed the difference threshold", the attenuation rate factor acting on the horizontal weighting coefficient and the attenuation rate factor acting on the vertical weighting coefficient may be correspondingly selected directly based on a current known and determined case without a need of determining a condition of "whether the difference between the horizontal texture feature and the vertical texture feature of the current block exceeds the difference threshold".

When the difference between the horizontal texture feature and the vertical texture feature of the current block exceeds the difference threshold, the attenuation rate factor acting on the horizontal weighting coefficient is different from the attenuation rate factor acting on the vertical weighting coefficient, or when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

The texture feature may include, for example, the side length, an auto variance, and/or edge acutance. Therefore, the horizontal texture feature may include a horizontal side length (e.g., length), a horizontal auto variance, horizontal edge acutance, and/or the like, and the vertical texture feature may include a vertical side length (e.g., width), a vertical auto variance, vertical edge acutance, and/or the like.

It can be understood that there is no necessary sequence between steps 301 and 302, and step 303. Further, for example, step 303 may be performed before, after, or at the same time as steps 301 and 302.

Step 304. The video coding apparatus performs weighted filtering on the initial predicted pixel value of the pixel in the current block to obtain a predicted pixel value of the pixel in the current block, where weighting coefficients used for the weighted filtering include the horizontal weighting coefficient and the vertical weighting coefficient.

A weighted filtering formula used to perform weighted filtering on the initial predicted pixel value of the pixel in the current block in step 304 may be Formula 3.

For a specific manner in which the video coding apparatus determines the attenuation rate factor acting on the horizontal weighting coefficient and the attenuation rate factor acting on the vertical weighting coefficient, refer to related descriptions in the embodiment corresponding to FIG. 2. Details are not described herein again.

Step 305. The video coding apparatus obtains a prediction residual of the current block based on the predicted pixel value of the pixel in the current block. The video coding apparatus may write the prediction residual of the current block into a video code stream.

It can be learned that, in the foregoing example video coding scheme, the weighting coefficients used to perform weighted filtering on the initial predicted pixel value of the pixel in the current block include the horizontal weighting coefficient and the vertical weighting coefficient, and different attenuation rate factors are set for the vertical weighting coefficient and the horizontal weighting coefficient. That is, the attenuation rate factor acting on the horizontal weighting coefficient may be different from the attenuation rate factor acting on the vertical weighting coefficient. Therefore, this helps differentially control attenuation rates of the vertical weighting coefficient and the horizontal weighting coefficient, further helps meet a requirement in some scenarios in which the vertical weighting coefficient and the horizontal weighting coefficient need to be attenuated at different attenuation rates, and helps improve image prediction accuracy because flexibility of controlling the attenuation rates of the vertical weighting coefficient and the horizontal weighting coefficient is improved. For example, when the difference between the horizontal texture feature and the vertical texture feature of the current block exceeds the difference threshold, a weighting coefficient attenuation rate difference better matches a texture feature difference, thereby helping improve the image prediction accuracy and improve video coding quality.

Figure 4:
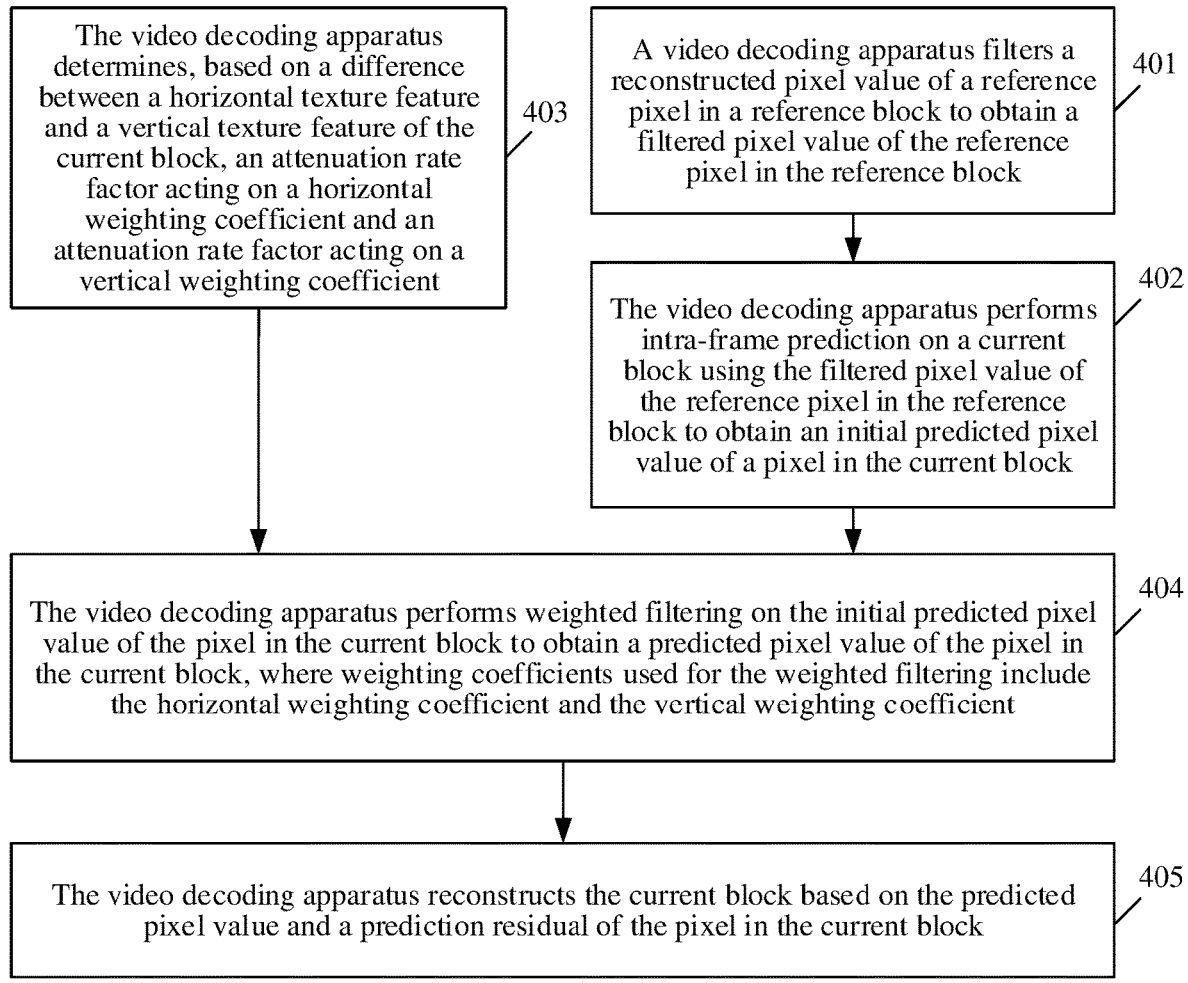
FIG. 4 is a schematic flowchart of an image decoding method according to an embodiment of this application.

FIG. 4 is a schematic flowchart of a video decoding method according to another embodiment of this application. The video decoding method may include but is not limited to the following steps.

Step 401. A video decoding apparatus filters a reconstructed pixel value of a reference pixel in a reference block to obtain a filtered pixel value of the reference pixel in the reference block.

Step 402. The video decoding apparatus performs intra-frame prediction on a current block using the filtered pixel value of the reference pixel in the reference block to obtain an initial predicted pixel value of a pixel in the current block.

The intra-frame prediction is, for example, directional intra-frame prediction, direct current coefficient intra-frame prediction, interpolation intra-frame prediction, or another intra-frame prediction method.

Step 403. The video decoding apparatus determines, based on a difference between a horizontal texture feature and a vertical texture feature of the current block, an attenuation rate factor acting on a horizontal weighting coefficient and an attenuation rate factor acting on a vertical weighting coefficient.

When the difference between the horizontal texture feature and the vertical texture feature of the current block exceeds a difference threshold, the attenuation rate factor acting on the horizontal weighting coefficient is different from the attenuation rate factor acting on the vertical weighting coefficient, or when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

A texture feature may include, for example, a side length, an auto variance, and/or edge acutance. Therefore, the horizontal texture feature may include a horizontal side length (e.g., length), a horizontal auto variance, horizontal edge acutance, and/or the like, and the vertical texture feature may include a vertical side length (e.g., width), a vertical auto variance, vertical edge acutance, and/or the like.

It can be understood that there is no necessary sequence between steps 401 and 402, and step 403. Further, for example, step 403 may be performed before, after, or at the same time as steps 401 and 402.

Step 404. The video decoding apparatus performs weighted filtering on the initial predicted pixel value of the pixel in the current block to obtain a predicted pixel value of the pixel in the current block, where weighting coefficients used for the weighted filtering include the horizontal weighting coefficient and the vertical weighting coefficient.

A weighted filtering formula used to perform weighted filtering on the initial predicted pixel value of the pixel in the current block in step 404 may be Formula 3.

For a specific manner in which the video decoding apparatus determines the attenuation rate factor acting on the horizontal weighting coefficient and the attenuation rate factor acting on the vertical weighting coefficient, refer to related descriptions in Embodiment corresponding to FIG. 2. Details are not described herein again.

Step 405. The video decoding apparatus reconstructs the current block based on the predicted pixel value and a prediction residual of the pixel in the current block.

The video decoding apparatus may obtain the prediction residual of the pixel in the current block from a video code stream.

It can be learned that, in the foregoing example video decoding scheme, the weighting coefficients used to perform weighted filtering on the initial predicted pixel value of the pixel in the current block include the horizontal weighting coefficient and the vertical weighting coefficient, and different attenuation rate factors are set for the vertical weighting coefficient and the horizontal weighting coefficient. That is, the attenuation rate factor acting on the horizontal weighting coefficient may be different from the attenuation rate factor acting on the vertical weighting coefficient. Therefore, this helps differentially control attenuation rates of the vertical weighting coefficient and the horizontal weighting coefficient, further helps meet a requirement in some scenarios in which the vertical weighting coefficient and the horizontal weighting coefficient need to be attenuated at different attenuation rates, and helps improve image prediction accuracy because flexibility of controlling the attenuation rates of the vertical weighting coefficient and the horizontal weighting coefficient is improved. For example, when the difference between the horizontal texture feature and the vertical texture feature of the current block exceeds the difference threshold, a weighting coefficient attenuation rate difference better matches a texture feature difference, thereby helping improve the image prediction accuracy and improve video decoding quality.

It is learned through testing that, compared with the related solution in Formula 1, in the solutions shown in the examples in FIG. 2 to FIG. 4, performance may be approximately improved by 0.2% in movie and television video sequence coding/decoding on some occasions.

Figures 5C, 6:
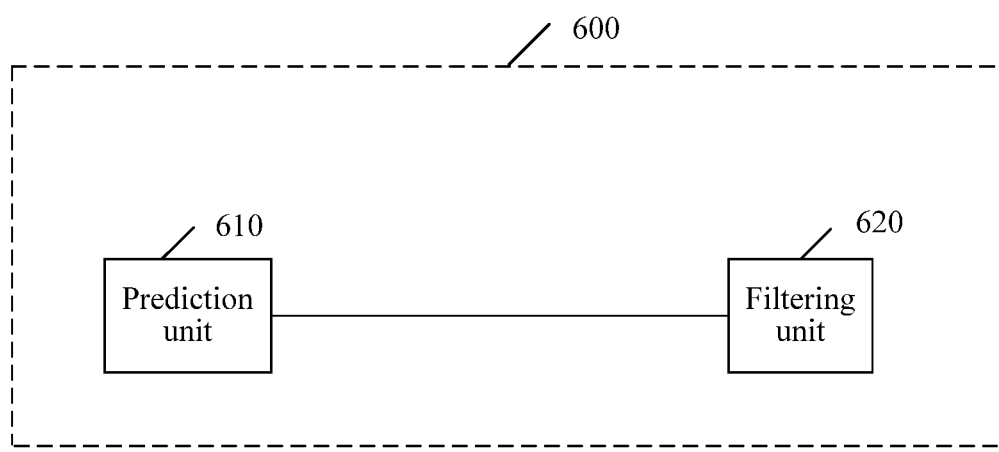

The following describes a difference between Formula 1 and Formula 3 using an example of an attenuation process of $c_{top}$ of an image block of an 8×32 size or an 8×16 size. Refer to FIG. 5A to FIG. 5C. FIG. 5A illustrates, using an example, a process in which $c_{top}$ of the image block of the 8×32 size is attenuated when Formula 1 is used, and $c_{top}$ is attenuated to 0 at a pixel in a seventh row. FIG. 5B illustrates, using an example, a process in which $c_{top}$ of the image block of the 8×16 size is attenuated when Formula 1 is used, and $c_{top}$ is attenuated to 0 at a pixel in a seventh row. This attenuation rate is basically the same as that of $c_{top}$ of the image block of the 8×32 size.

FIG. 5C illustrates, using an example, a process in which $c_{top}$ of the image block of the 8×32 size is attenuated when Formula 3 is used (that $d_1=1$, $d_2=2$ is used as an example), and $c_{top}$ is attenuated to 0 at a pixel in an eleventh row. It can be learned that a degree of filtering the predicted pixel value using Formula 3 is relatively high, thereby improving coding/decoding performance.

The following describes values of $c_{top}$ and $c_{left}$ using an example.

For example, if a length of an image block is 4, an array corresponding to a prediction direction may be selected from the following 35 arrays based on the prediction direction, and one of six numbers included in the array may be selected as the value of $c_{top}$. Likewise, if a width of the image block is 4, an array corresponding to a prediction direction may be selected from the following 35 arrays based on the prediction direction, and one of six numbers included in the array may be selected as the value of $c_{left}$.

{
{33, 7, 33, 7, 30, 3},
{25, 5, 25, 5, 0, 0},
{10, 8, 29, 4, 11, 1},
{10, 8, 29, 4, 11, 1},
{17, 5, 20, 5, 52, 1},
{17, 5, 20, 5, 52, 1},
{21, 3, 18, 7, 70, 2},
{21, 3, 18, 7, 70, 2},
{20, 1, 18, 11, 63, 2},
{20, 1, 18, 11, 63, 2},
{16, 1, 30, 24, 56, 1},
{16, 1, 30, 24, 56, 1},
{15, 0, 15, 14, 67, 3},
{15, 0, 15, 14, 67, 3},
{15, 2, 9, 2, 62, 1},
{15, 2, 9, 2, 62, 1},
{11, 4, 10, 2, 40, 1},
{11, 4, 10, 2, 40, 1},
{4, 3, 4, 3, 22, 1},
{10, 2, 11, 4, 40, 1},
{10, 2, 11, 4, 40, 1},
{9, 2, 15, 2, 62, 1},
{9, 2, 15, 2, 62, 1},
{15, 14, 15, 0, 67, 3},
{15, 14, 15, 0, 67, 3},
{30, 24, 16, 1, 56, 1},
{30, 24, 16, 1, 56, 1},
{18, 11, 20, 1, 63, 2},
{18, 11, 20, 1, 63, 2},
{18, 7, 21, 3, 70, 2},
{18, 7, 21, 3, 70, 2},
{20, 5, 17, 5, 52, 1},
{20, 5, 17, 5, 52, 1},
{29, 4, 10, 8, 11, 1},
{29, 4, 10, 8, 11, 1}
}

For another example, if a length of an image block is 8, an array corresponding to a prediction direction may be selected from the following 35 arrays based on the prediction direction, and one of six numbers included in the array may be selected as the value of $c_{top}$. Likewise, if a width of the image block is 8, an array corresponding to a prediction direction may be selected from the following 35 arrays based on the prediction direction, and one of six numbers included in the array may be selected as the value of $c_{left}$.

{
{36, 7, 36, 7, 26, 3},
{33, 8, 33, 8, 0, 0},
{22, 7, 32, 6, 24, 3},
{22, 7, 32, 6, 24, 3},
{35, 4, 29, 8, 45, 2},
{35, 4, 29, 8, 45, 2},
{41, 3, 27, 12, 65, 3},
{41, 3, 27, 12, 65, 3},
{54, 1, 26, 16, 63, 2},
{54, 1, 26, 16, 63, 2},
{54, −1, 34, 25, 52, 1},
{54, −1, 34, 25, 52, 1},
{24, −1, 21, 20, 62, 1},
{24, −1, 21, 20, 62, 1},
{21, 3, 19, 3, 35, 1},
{21, 3, 19, 3, 35, 1},
{19, 4, 21, 3, 36, 2},
{19, 4, 21, 3, 36, 2},
{15, 6, 15, 6, 23, 2},
{21, 3, 19, 4, 36, 2},
{21, 3, 19, 4, 36, 2},
{19, 3, 21, 3, 35, 1},
{19, 3, 21, 3, 35, 1},
{21, 20, 24, −1, 62, 1},
{21, 20, 24, −1, 62, 1},
{34, 25, 54, −1, 52, 1},
{34, 25, 54, −1, 52, 1},
{26, 16, 54, 1, 63, 2},
{26, 16, 54, 1, 63, 2},
{27, 12, 41, 3, 65, 3},
{27, 12, 41, 3, 65, 3},
{29, 8, 35, 4, 45, 2},
{29, 8, 35, 4, 45, 2},
{32, 6, 22, 7, 24, 3},
{32, 6, 22, 7, 24, 3}
}

For another example, if a length of an image block is 16, an array corresponding to a prediction direction may be selected from the following 35 arrays based on the prediction direction, and one of six numbers included in the array may be selected as the value of $c_{top}$. Likewise, if a width of the image block is 16, an array corresponding to a prediction direction may be selected from the following 35 arrays based on the prediction direction, and one of six numbers included in the array may be selected as the value of $c_{left}$.

{
{45, 5, 45, 5, −5, 3},
{36, 8, 36, 8, 0, 0},
{30, 6, 46, 6, −15, 3},
{30, 6, 46, 6, −15, 3},
{31, 5, 39, 8, 15, 3},
{31, 5, 39, 8, 15, 3},
{35, 3, 35, 11, 42, 3},
{35, 3, 35, 11, 42, 3},
{45, 1, 35, 19, 46, 3},
{45, 1, 35, 19, 46, 3},
{32, 0, 40, 32, 47, 3},
{32, 0, 40, 32, 47, 3},
{38, 0, 23, 13, 38, 2},
{38, 0, 23, 13, 38, 2},
{26, 2, 24, 0, 28, 3},
{26, 2, 24, 0, 28, 3},
{25, 2, 23, 0, 19, 3},
{25, 2, 23, 0, 19, 3},
{29, 1, 29, 1, −7, 3},
{24, 0, 25, 2, 19, 3},
{24, 0, 25, 2, 19, 3},
{24, 0, 26, 2, 28, 3},
{24, 0, 26, 2, 28, 3},
{23, 13, 38, 0, 38, 2},
{23, 13, 38, 0, 38, 2},
{40, 32, 32, 0, 47, 3},
{40, 32, 32, 0, 47, 3},
{35, 19, 45, 1, 46, 3},
{35, 19, 45, 1, 46, 3},
{35, 11, 35, 3, 42, 3},
{35, 11, 35, 3, 42, 3},
{39, 8, 31, 5, 15, 3},

```
        {39, 8, 31, 5, 15, 3},
        {46, 6, 30, 6, −15, 3},
        {46, 6, 30, 6, −15, 3}
}
```

For another example, if a length of an image block is 32, an array corresponding to a prediction direction may be selected from the following 35 arrays based on the prediction direction, and one of six numbers included in the array may be selected as the value of $c_{top}$. Likewise, if a width of the image block is 32, an array corresponding to a prediction direction may be selected from the following 35 arrays based on the prediction direction, and one of six numbers included in the array may be selected as the value of $c_{left}$.

```
{
        {46, 6, 46, 6, −3, 5},
        {44, 4, 44, 4, 0, 0},
        {33, 3, 52, 4, −18, 5},
        {33, 3, 52, 4, −18, 5},
        {38, 3, 50, 5, −5, 5},
        {38, 3, 50, 5, −5, 5},
        {40, 2, 47, 9, 16, 5},
        {40, 2, 47, 9, 16, 5},
        {48, 1, 45, 17, 22, 5},
        {48, 1, 45, 17, 22, 5},
        {45, −1, 46, 30, 36, 5},
        {45, −1, 46, 30, 36, 5},
        {41, 1, 37, −1, 14, 5},
        {41, 1, 37, −1, 14, 5},
        {35, 1, 39, −2, 3, 5},
        {35, 1, 39, −2, 3, 5},
        {41, −1, 43, −1, −7, 5},
        {41, −1, 43, −1, −7, 5},
        {32, 0, 32, 0, −6, 5},
        {43, −1, 41, −1, −7, 5},
        {43, −1, 41, −1, −7, 5},
        {39, −2, 35, 1, 3, 5},
        {39, −2, 35, 1, 3, 5},
        {37, −1, 41, 1, 14, 5},
        {37, −1, 41, 1, 14, 5},
        {46, 30, 45, −1, 36, 5},
        {46, 30, 45, −1, 36, 5},
        {45, 17, 48, 1, 22, 5},
        {45, 17, 48, 1, 22, 5},
        {47, 9, 40, 2, 16, 5},
        {47, 9, 40, 2, 16, 5},
        {50, 5, 38, 3, −5, 5},
        {50, 5, 38, 3, −5, 5},
        {52, 4, 33, 3, −18, 5},
        {52, 4, 33, 3, −18, 5}
}
```

For another example, if a length of an image block is 64, an array corresponding to a prediction direction may be selected from the following 35 arrays based on the prediction direction, and one of six numbers included in the array may be selected as the value of $c_{top}$. Likewise, if a width of the image block is 64, an array corresponding to a prediction direction may be selected from the following 35 arrays based on the prediction direction, and one of six numbers included in the array may be selected as the value of $c_{left}$.

```
{
        {42, 5, 42, 5, −5, 7},
        {40, 3, 40, 3, 0, 0},
        {28, 2, 49, 3, −22, 7},
        {28, 2, 49, 3, −22, 7},
        {27, 2, 48, 3, −16, 7},
        {27, 2, 48, 3, −16, 7},
        {27, 1, 44, 5, 8, 7},
        {27, 1, 44, 5, 8, 7},
        {41, 2, 39, 12, 16, 7},
        {41, 2, 39, 12, 16, 7},
        {42, 0, 38, 21, 24, 7},
        {42, 0, 38, 21, 24, 7},
        {38, 0, 34, −4, 5, 7},
        {38, 0, 34, −4, 5, 7},
        {37, 1, 43, −1, −5, 7},
        {37, 1, 43, −1, −5, 7},
        {25, 0, 42, −1, −13, 7},
        {25, 0, 42, −1, −13, 7},
        {27, −1, 27, −1, −11, 7},
        {42, −1, 25, 0, −13, 7},
        {42, −1, 25, 0, −13, 7},
        {43, −1, 37, 1, −5, 7},
        {43, −1, 37, 1, −5, 7},
        {34, −4, 38, 0, 5, 7},
        {34, −4, 38, 0, 5, 7},
        {38, 21, 42, 0, 24, 7},
        {38, 21, 42, 0, 24, 7},
        {39, 12, 41, 2, 16, 7},
        {39, 12, 41, 2, 16, 7},
        {44, 5, 27, 1, 8, 7},
        {44, 5, 27, 1, 8, 7},
        {48, 3, 27, 2, −16, 7},
        {48, 3, 27, 2, −16, 7},
        {49, 3, 28, 2, −22, 7},
        {49, 3, 28, 2, −22, 7}
}
```

Certainly, the values of $c_{top}$ and $c_{left}$ may alternatively be other empirical values, and $c_{topleft}$ may be obtained based on $c_{top}$ and $c_{left}$, or may be another empirical value.

The following further provides a related apparatus configured to implement the foregoing solutions.

Referring to FIG. 6, an embodiment of this application provides an image prediction apparatus 600, including a prediction unit 610 and a filtering unit 620.

The prediction unit 610 is configured to perform intra-frame prediction on a current block using a reference block to obtain an initial predicted pixel value of a pixel in the current block.

The intra-frame prediction is, for example, directional intra-frame prediction, direct current coefficient intra-frame prediction, or interpolation intra-frame prediction.

The filtering unit 620 is configured to perform weighted filtering on the initial predicted pixel value of the pixel in the current block to obtain a predicted pixel value of the pixel in the current block, where weighting coefficients used for the weighted filtering include a horizontal weighting coefficient and a vertical weighting coefficient, and an attenuation rate factor acting on the horizontal weighting coefficient is different from an attenuation rate factor acting on the vertical weighting coefficient.

Further, for example, when a difference between a horizontal texture feature and a vertical texture feature of the current block exceeds a difference threshold, the attenuation rate factor acting on the horizontal weighting coefficient is different from the attenuation rate factor acting on the vertical weighting coefficient.

For another example, when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

A texture feature may include, for example, a side length, an auto variance, and/or edge acutance. Therefore, the horizontal texture feature may include a horizontal side length (e.g., length), a horizontal auto variance, horizontal edge acutance, and/or the like, and the vertical texture feature may include a vertical side length (e.g., width), a vertical auto variance, vertical edge acutance, and/or the like.

For example, the prediction unit 610 is further configured to filter a reconstructed pixel value of a reference pixel in the reference block to obtain a filtered pixel value of the reference pixel in the reference block, and perform intra-frame prediction on the current block using the filtered pixel value of the reference pixel in the reference block, to obtain the initial predicted pixel value of the pixel in the current block, or perform intra-frame prediction on the current block using a reconstructed pixel value of a reference pixel in the reference block to obtain the initial predicted pixel value of the pixel in the current block.

For example, the filtering unit 620 is configured to perform weighted filtering on the initial predicted pixel value of the pixel in the current block according to the following weighted filtering formulas to obtain the predicted pixel value of the pixel in the current block:

$$p''[x, y] = \left\{ \begin{array}{l} (c_{top} \gg [y/d_2])r[x, -1] - (c_{topleft} \gg [x/d_1])r[-1, -1] + \\ (c_{left} \gg [x/d_1])r[-1, y] + c_{cur}p'[x, y] + 32 \end{array} \right\} \gg 6;$$

and $c_{cur} = 64 - (c_{top} \gg [y/d_2]) - (c_{left} \gg [x/d_1]) + (c_{topleft} \gg [x/d_1])$, where $c_{top}$ is a horizontal weighting coefficient, and $c_{left}$ and $c_{topleft}$ are vertical weighting coefficients, and $c_{top}$ represents a weighting coefficient corresponding to a reconstructed pixel value of a top adjacent reference block of the current block, $c_{left}$ represents a weighting coefficient corresponding to a reconstructed pixel value of a left adjacent reference block of the current block, $c_{topleft}$ represents a weighting coefficient corresponding to a reconstructed pixel value of a top-left adjacent reference block of the current block, x represents a horizontal coordinate of a pixel in the current block relative to a top-left vertex of the current block, y represents a vertical coordinate of the pixel in the current block relative to the top-left vertex of the current block, $d_2$ is the attenuation rate factor acting on the horizontal weighting coefficient, $d_1$ is the attenuation rate factor acting on the vertical weighting coefficient, $d_1$ and $d_2$ are real numbers, p"[x, y] represents a predicted pixel value of a pixel whose coordinates are [x, y] in the current block, p'[x, y] represents an initial predicted pixel value of the pixel whose coordinates are [x, y] in the current block, r [x, −1] represents a reconstructed pixel value of a pixel whose coordinates are [x, −1] in the top adjacent reference block of the current block, r[−1, −1] represents a reconstructed pixel value of a pixel whose coordinates are [−1, −1] in the top-left adjacent reference block of the current block, and r[−1, y] represents a reconstructed pixel value of a pixel whose coordinates are [−1, y] in the left adjacent reference block of the current block.

For example, the texture feature includes the side length, and the difference threshold includes a threshold thresh1.

When a ratio of a length to a width of the current block is greater than the threshold thresh1, $d_1=1$, and $d_2=2$, and when a ratio of the width to the length of the current block is greater than the threshold thresh1, $d_1=2$, and $d_2=1$, where thresh1 is a real number greater than 2.

For another example, when the ratio of the length to the width of the current block is less than the threshold thresh1, the length of the current block is greater than or equal to the width, and when a sum of the length and the width of the current block is greater than a threshold thresh4, $d_1=d_2=2$, and/or when the ratio of the length to the width of the current block is less than the threshold thresh1, the length of the current block is greater than or equal to the width, and the sum of the length and the width of the current block is less than or equal to the threshold thresh4, $d_1=d_2=1$, where thresh4 is a real number greater than or equal to 64.

For another example, the texture feature includes the side length. When a length of the current block is greater than a threshold thresh2, $d_1=2$, or when the length of the current block is less than or equal to the threshold thresh2, $d_1=1$, where thresh2 is a real number greater than or equal to 16, and/or when a width of the current block is greater than a threshold thresh3, $d_2=2$, or when the width of the current block is less than or equal to the threshold thresh3, $d_2=1$, where thresh3 is a real number greater than or equal to 16.

It can be understood that the image prediction apparatus 600 may be a video coding apparatus or a video decoding apparatus, and the video coding apparatus or the video decoding apparatus may be any apparatus that needs to output or store a video, such as a notebook computer, a tablet computer, a personal computer, a mobile phone, or a video server. A function of the image prediction apparatus 600 in this embodiment may be further implemented based on the solutions in the foregoing method embodiments. For some parts not described, refer to the foregoing embodiments.

Figure 7:
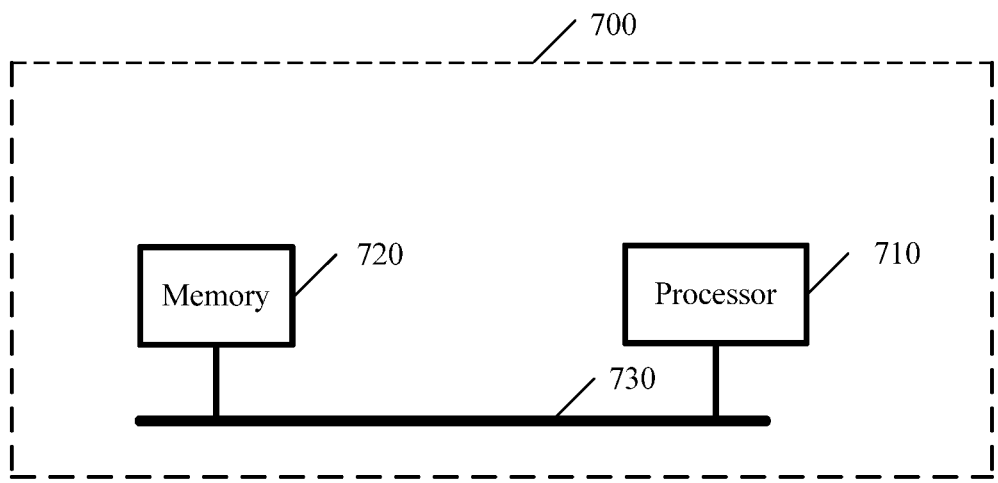
FIG. 7 is a schematic diagram of another image prediction apparatus according to an embodiment of this application.

Referring to FIG. 7, an embodiment of this application provides an image prediction apparatus 700, including a processor 710 and a memory 720 that are coupled to each other. The memory 720 is configured to store an instruction and data, and the processor 710 is configured to execute the instruction. The processor 710 is configured to perform some or all of the steps of the methods in the foregoing method embodiments.

The processor 710 is also referred to as a central processing unit (CPU). During specific application, all components of the image prediction apparatus are, for example, coupled together using a bus system. In addition to a data bus, the bus system may further include a power bus, a control bus, a status signal bus, and the like. However, for clarity of description, various buses are marked as the bus system 730 in the figure. The methods disclosed in the embodiments of this application may be applied to the processor 710, or may be implemented by the processor 710. The processor 710 may be an integrated circuit chip and has a signal processing capability. In some implementation processes, each step of the foregoing methods may be completed using an integrated logic circuit of hardware in the processor 710 or an instruction in a form of software. The processor 710 may be a general purpose processor, a digital signal processor, an application-specific integrated circuit, a field programmable gate array or another programmable logic device, a discrete gate or a transistor logic device, or a discrete hardware component. The processor 710 may implement or perform all methods, steps, and logical block diagrams disclosed in the embodiments of this application. The general purpose processor 710 may be a microprocessor, or the processor may be any conventional processor or the like. Steps of the methods disclosed in the embodiments of this application may be directly performed and completed by a hardware decoding processor, or may be performed and completed using a combination of hardware in the decoding processor and a software module. The software module may be located in a mature storage medium in the field, such as a random access memory, a flash memory, a read-only memory, a programmable read-only memory, an electrically-erasable programmable memory, or a register. The storage medium is located in the memory 720. For example, the processor 710 may read information in the memory 720, and complete the steps in the foregoing methods in combination with hardware of the processor.

For example, the processor 710 may be configured to perform intra-frame prediction on a current block using a reference block, to obtain an initial predicted pixel value of a pixel in the current block, and perform weighted filtering on the initial predicted pixel value of the pixel in the current block to obtain a predicted pixel value of the pixel in the current block, where weighting coefficients used for the weighted filtering include a horizontal weighting coefficient and a vertical weighting coefficient, and an attenuation rate factor acting on the horizontal weighting coefficient may be different from an attenuation rate factor acting on the vertical weighting coefficient.

Further, for example, when a difference between a horizontal texture feature and a vertical texture feature of the current block exceeds a difference threshold, the attenuation rate factor acting on the horizontal weighting coefficient is different from the attenuation rate factor acting on the vertical weighting coefficient.

For another example, when the difference between the horizontal texture feature and the vertical texture feature of the current block does not exceed the difference threshold, the attenuation rate factor acting on the horizontal weighting coefficient is the same as the attenuation rate factor acting on the vertical weighting coefficient.

It can be understood that the image prediction apparatus 700 may be a video coding apparatus or a video decoding apparatus, and the video coding apparatus or the video decoding apparatus may be any apparatus that needs to output or store a video, such as a notebook computer, a tablet computer, a personal computer, a mobile phone, or a video server. A function of the image prediction apparatus 700 in this embodiment may be further implemented based on the solutions in the foregoing method embodiments. For some parts not described, refer to the foregoing embodiments.

Figure 8:
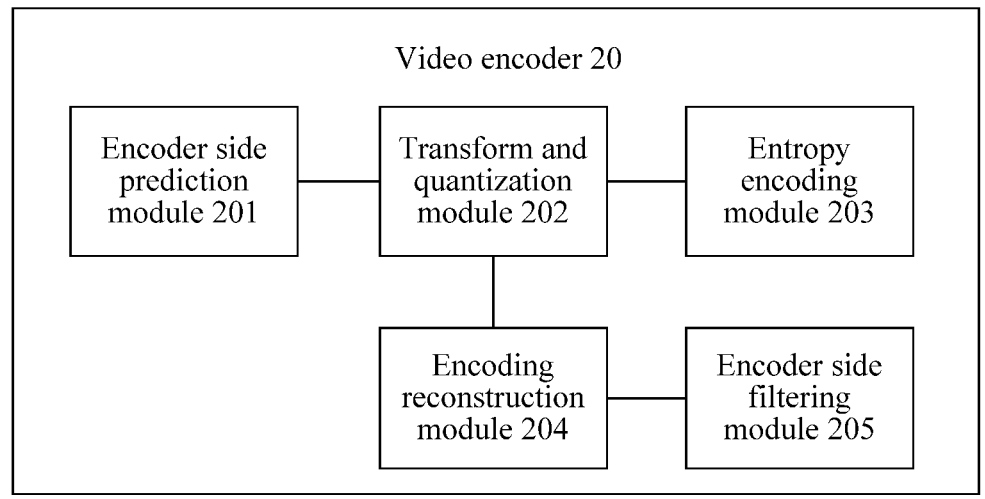
FIG. 8 is a schematic diagram of a video encoder according to an embodiment of this application.
Figure 9:
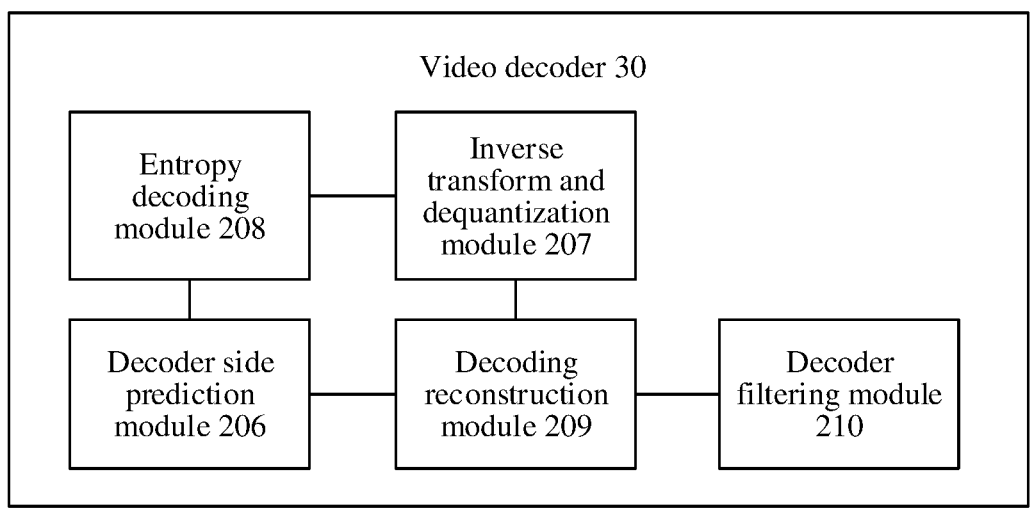
FIG. 9 is a schematic diagram of a video decoder according to an embodiment of this application.

FIG. 8 is a schematic block diagram of a video encoder 20 that can be used according to an embodiment of this application. The video encoder 20 includes an encoder side prediction module 201, a transform and quantization module 202, an entropy encoding module 203, an encoding reconstruction module 204, and an encoder side filtering module 205. FIG. 9 is a schematic block diagram of a video decoder 30 that can be used according to an embodiment of this application. The video decoder 30 includes a decoder side prediction module 206, an inverse transform and dequantization module 207, an entropy decoding module 208, a decoding reconstruction module 209, and a decoding filtering module 210.

The video encoder 20 may be configured to implement the image prediction method or the video coding method in the embodiments of this application. The video decoder 30 may be configured to implement the image prediction method or the video decoding method in the embodiments of this application. Details are as follows.

The encoder side prediction module 201 and the decoder side prediction module 206 are configured to generate prediction data. The video encoder 20 may generate one or more prediction units (PUs) of each CU that cannot be segmented. Each PU of the CU may be associated with different pixel blocks in a pixel block of the CU. The video encoder 20 may generate a predictive pixel block for each PU of the CU. The video encoder 20 may generate the predictive pixel block of the PU through intra-frame prediction or inter prediction. If the video encoder 20 generates the predictive pixel block of the PU through intra-frame prediction, the video encoder 20 may generate the predictive pixel block of the PU based on a pixel in a decoded picture associated with the PU. If the video encoder 20 generates the predictive pixel block of the PU through inter prediction, the video encoder 20 may generate the predictive pixel block of the PU based on a pixel in one or more decoded pictures associated with the PU. The video encoder 20 may generate a residual pixel block of the CU based on the predictive pixel block of the PU of the CU. The residual pixel block of the CU may indicate a difference between a sampling value in the predictive pixel block of the PU of the CU and a corresponding sampling value in an initial pixel block of the CU.

The transform and quantization module 202 is configured to process residual data obtained through prediction. The video encoder 20 may perform recursive quadtree segmentation on the residual pixel block of the CU to segment the residual pixel block of the CU into one or more smaller residual pixel blocks associated with a transform unit (TU) of the CU. Because each pixel in the pixel block associated with the TU corresponds to one luminance sample and two chrominance samples, each TU may be associated with one luminance residual sample block and two chrominance residual sample blocks. The video encoder 20 may apply one or more times of transform to the residual sample block associated with the TU to generate a coefficient block (that is, a block of a coefficient). The transform may be DCT transform or a variant thereof. A DCT transform matrix is used, and two-dimensional transform is calculated using one-dimensional transform in a horizontal direction and a vertical direction, to obtain the coefficient block. The video encoder 20 may quantize each coefficient in the coefficient block. Quantization usually means a process in which the coefficient is quantized to reduce an amount of data used to represent the coefficient to provide further compression. The inverse transform and dequantization module 207 performs an inverse process of the transform and quantization module 202.

The video encoder 20 may generate a set of syntactic elements that represent the quantized coefficients in the coefficient block. The video encoder 20 may apply an entropy encoding operation (such as a context-adaptive binary arithmetic coding (CABAC) operation) to some or all of the foregoing syntactic elements using the entropy encoding module 203. To apply CABAC coding to the syntactic elements, the video encoder 20 may binarize the syntactic elements to form a binary sequence including one or more bits (referred to as a "binary bit"). The video encoder 20 may encode a part of the binary bits through regular encoding, and may encode another part of the binary bits through bypass encoding.

In addition to syntactic elements of an entropy encoding coefficient block, the video encoder 20 may apply dequantization and inverse transform to a transformed coefficient block using the encoding reconstruction module 204 to reconstruct the residual sample block from the transformed coefficient block. The video encoder 20 may add the reconstructed residual sample block and a corresponding sample block of one or more predictive sample blocks to generate a reconstructed sample block. The video encoder 20 may reconstruct, by reconstructing a sample block of each color component, a pixel block associated with the TU. A pixel block of each TU of the CU is reconstructed in this manner, until reconstruction of all pixel blocks of the CU is completed.

After the video encoder 20 reconstructs the pixel block of the CU, the video encoder 20 performs a de-blocking filtering operation using the encoder side filtering module 205, to reduce a blocking effect of a pixel block associated with the CU. After the video encoder 20 performs the de-blocking filtering operation, the video encoder 20 may modify a reconstructed pixel block of a CTB of a picture using a sample adaptive offset (SAO). After performing these operations, the video encoder 20 may store the reconstructed pixel block of the CU in a decoded picture buffer, to generate a predictive pixel block of another CU.

The video decoder 30 may receive a code stream. The code stream includes encoding information of video data encoded by the video encoder 20 in a form of a code stream. The video decoder 30 parses, using the entropy decoding module 208, the code stream to extract a syntactic element from the code stream. When the video decoder 30 performs CABAC decoding, the video decoder 30 may perform rule decoding on a part of binary bits, and may perform bypass decoding on other parts of the binary bits. The binary bits in the code stream have a mapping relationship with the syntactic element, and the syntactic element is obtained by parsing the binary bit. The video decoder 30 may reconstruct, using the decoding reconstruction module 209, a picture of the video data based on the syntactic element extracted from the code stream. A process of reconstructing video data based on a syntactic element is generally inverse to a process in which the video encoder 20 performs an operation to generate a syntactic element. For example, the video decoder 30 may generate a predictive pixel block of the PU of the CU based on the syntactic element associated with the CU. In addition, the video decoder 30 may dequantize a coefficient block associated with the TU of the CU. The video decoder 30 may inversely transform the dequantized coefficient block to reconstruct a residual pixel block associated with the TU of the CU. The video decoder 30 may reconstruct a pixel block of the CU based on the predictive pixel block and the residual pixel block.

After the video decoder 30 reconstructs the pixel block of the CU, the video decoder 30 performs a de-blocking filtering operation using the decoding filtering module 210, to reduce a blocking effect of a pixel block associated with the CU. In addition, based on one or more SAO syntactic elements, the video decoder 30 may perform the same SAO operation as the video encoder 20. After the video decoder 30 performs these operations, the video decoder 30 may store the pixel block of the CU in a decoded picture buffer. The decoded picture buffer may provide reference pictures for subsequent motion compensation, intra-frame prediction, and display apparatus presentation.

An embodiment of this application further provides a computer readable storage medium, the computer readable storage medium stores program code, and the program code includes an instruction used to perform some or all of the steps of the methods in the foregoing method embodiments.

An embodiment of this application further provides a computer program product, and when the computer program product runs on a computer, the computer performs some or all of the steps of the methods in the foregoing method embodiments.

An embodiment of this application further provides a computer program product, and when the computer program product runs on a computer, the computer performs some or all of the steps of the methods in the foregoing method embodiments.

An embodiment of this application further provides an application release platform. The application release platform is configured to release a computer program product. When the computer program product runs on a computer, the computer performs some or all of the steps of the methods in the foregoing method embodiments.

Figure 10:
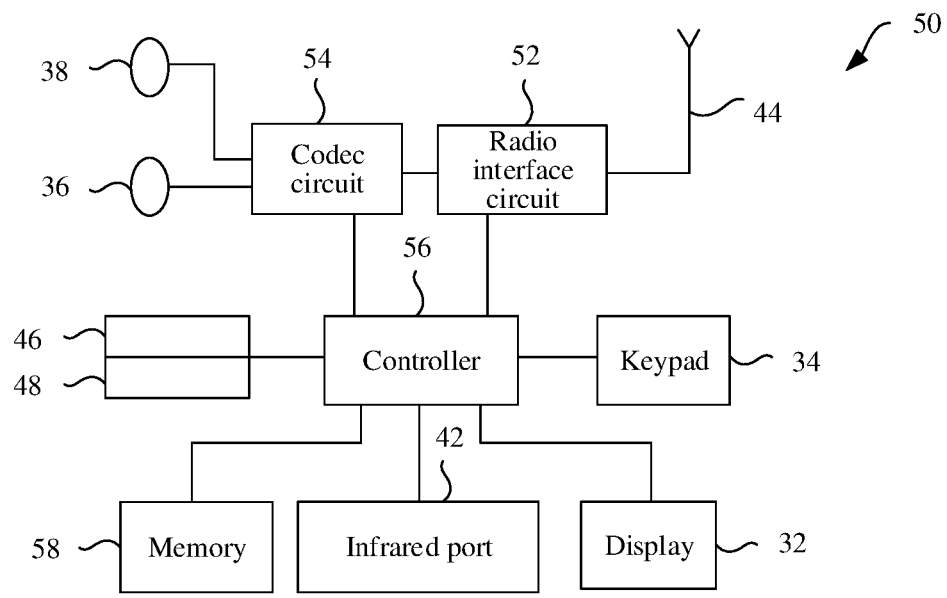
FIG. 10 is a schematic block diagram of an electronic apparatus according to an embodiment of this application.
Figure 11:
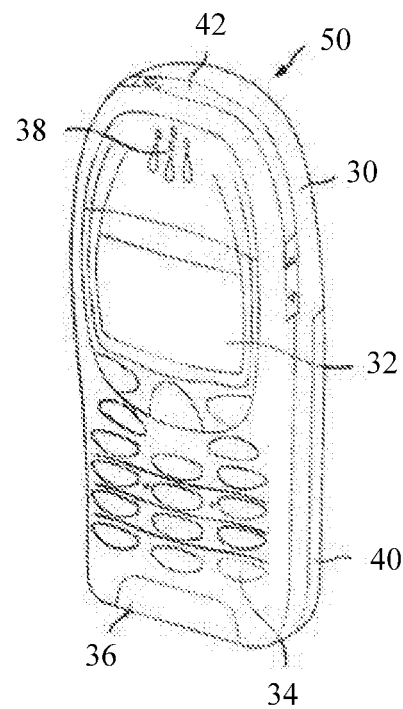
FIG. 11 is another schematic block diagram of an electronic apparatus according to an embodiment of this application.

FIG. 10 and FIG. 11 are two schematic block diagrams of an electronic apparatus 50. The electronic apparatus 50 may be incorporated into a codec that can be used in this embodiment of this application. FIG. 11 is a schematic apparatus diagram of video coding according to an embodiment of this application. The following describes units in FIG. 10 and FIG. 11.

The electronic apparatus 50 may be, for example, a mobile terminal or user equipment in a wireless communications system. It should be understood that the embodiments of this application can be implemented on any electronic device or apparatus that may need to encode and decode, or encode, or decode a video image.

The apparatus 50 may include a housing 30 that is used to protect the device and that is incorporated into the device. The apparatus 50 may further include a display 32 in a form of a liquid crystal display. In another embodiment of this application, the display may be any appropriate display technology suitable for displaying an image or a video. The apparatus 50 may further include a keypad 34. In another embodiment of this application, any appropriate data or user interface mechanism may be used. For example, a user interface may be implemented as a virtual keyboard, or a data entry system may be implemented as a part of a touch-sensitive display. The apparatus 50 may include a microphone 36 or any appropriate audio input, and the audio input may be digital or analog signal input. The apparatus 50 may further include the following audio output device. The audio output device in this embodiment of this application may be any one of an earphone 38, a speaker, an analog audio output connection, or a digital audio output connection. The apparatus 50 may also include a battery 40. In another embodiment of this application, the device may be powered by any appropriate mobile energy device such as a solar cell, a fuel cell, or a clock mechanism generator. The apparatus 50 may further include an infrared port 42 used for short-range line-of-sight communication with another device. In another embodiment, the apparatus 50 may further include any appropriate short-range communication solution such as a BLUETOOTH wireless connection or a universal serial bus (USB)/live line wired connection.

The apparatus 50 may include a controller 56 or a processor that is configured to control the apparatus 50. The controller 56 may be connected to a memory 58. The memory 58 in this embodiment of this application may store image data or audio data, and/or may store an instruction implemented on the controller 56. The controller 56 may be further connected to a codec circuit 54 that is suitable for implementing audio and/or video data encoding and decoding, or that is suitable for auxiliary encoding and decoding implemented by the controller 56.

The apparatus 50 may further include a smartcard 46 and a card reader 48, such as a universal integrated circuit card (UICC) and a UICC reader, that are configured to provide user information and that are suitable for providing authentication information used for network authentication and user authorization.

The apparatus 50 may further include a radio interface circuit 52. The radio interface circuit is connected to the controller and is suitable for generating, for example, a wireless communication signal used for communication with a cellular communications network, a wireless communications system, or a wireless local area network. The apparatus 50 may further include an antenna 44. The antenna 44 is connected to the radio interface circuit 52, and is configured to send, to another apparatus (or a plurality of apparatuses), a radio frequency signal generated in the radio interface circuit 52, and receive a radio frequency signal from the other apparatus (or the plurality of apparatuses).

In some embodiments of this application, the apparatus 50 includes a camera capable of recording or detecting single frames, and the codec circuit 54 or the controller receives and processes these single frames. In some embodiments of this application, the apparatus may receive to-be-processed video image data from another device before transmission and/or storage. In some embodiments of this application, the apparatus 50 may receive an image through a wireless or wired connection for encoding/decoding.

The solutions of the embodiments of this application may be applied to various electronic apparatuses. For example, the following provides an example in which the embodiments of this application are applied to a television device and a mobile phone device.

Figure 12:
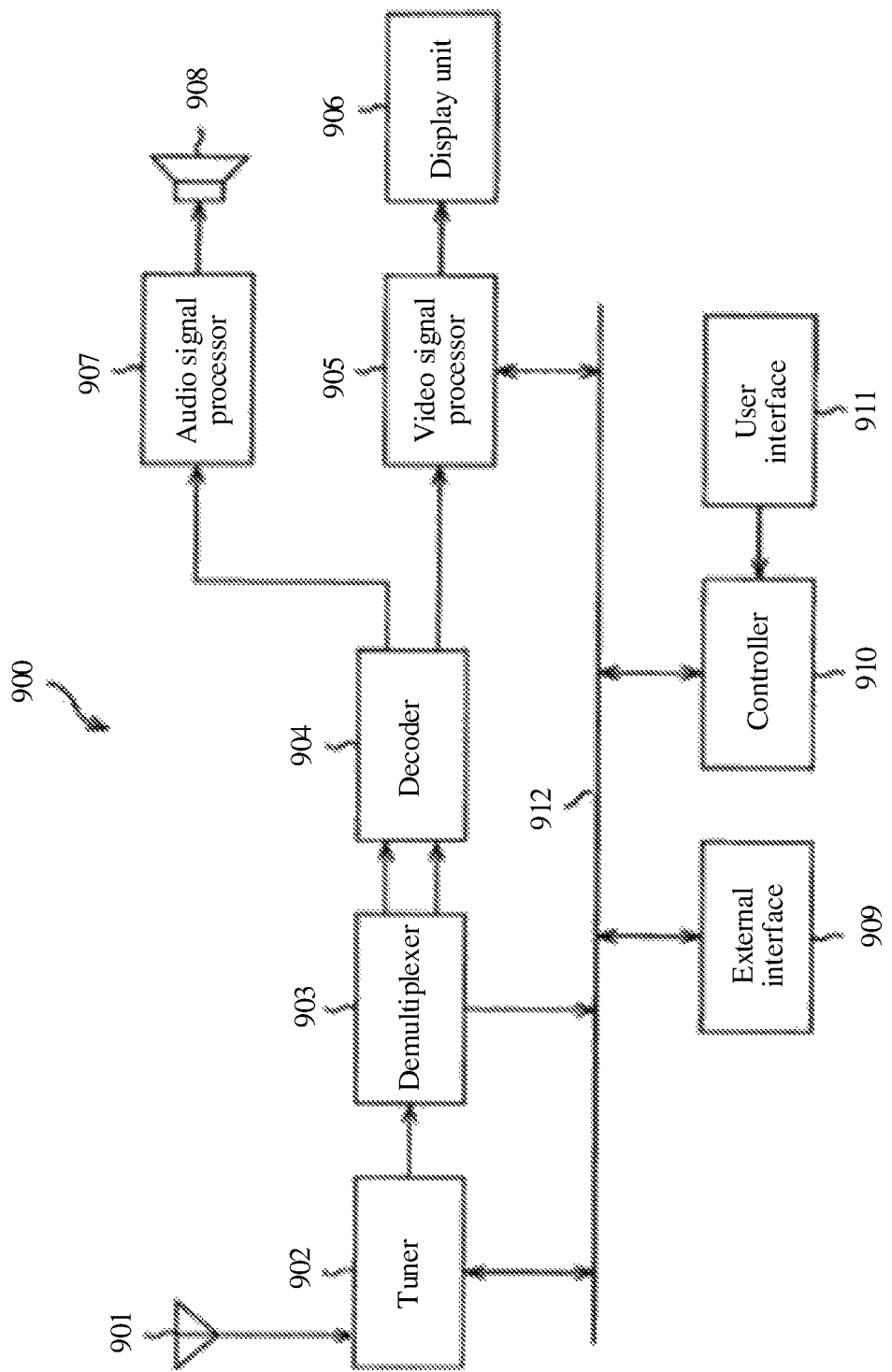
FIG. 12 is a schematic structural diagram of a television application according to an embodiment of the present application.

FIG. 12 is a schematic structural diagram of a television application according to an embodiment of this application.

A television device 900 includes an antenna 901, a tuner 902, a demultiplexer 903, a decoder 904, a video signal processor 905, a display unit 906, an audio signal processor 907, a speaker 908, an external interface 909, a controller 910, a user interface 911, a bus 912, and the like.

The tuner 902 extracts a signal of an expected channel from a broadcast signal received using the antenna 901, and demodulates the extracted signal. Then the tuner 902 outputs, to the demultiplexer 903, an encoded bit stream obtained through demodulation. That is, the tuner 902 serves as a sending apparatus in the television device 900 that receives a code stream of an encoded image. The demultiplexer 903 separates a video stream and an audio stream of a program to be watched from the encoded bit stream, and outputs the separated streams to the decoder 904. The demultiplexer 903 further extracts auxiliary data from the encoded bit stream, such as an electronic program guide, and provides the controller 910 with the extracted data. If the encoded bit stream is scrambled, the demultiplexer 903 may descramble the encoded bit stream.

The decoder 904 decodes the video stream and the audio stream that are input from demultiplexer 903. Then the decoder 904 outputs, to the video signal processor 905, video data generated through decoding. The decoder 904 further outputs, to the video signal processor 907, audio data generated through decoding.

The video signal processor 905 reproduces the video data that is input from the decoder 904, and displays the video data on the display unit 906. The video signal processor 905 may further display, on the display unit 906, an application picture provided through a network. In addition, the video signal processor 905 may perform additional processing, such as noise removal, on the video data based on a setting. The video signal processor 905 may further generate a graphical user interface (GUI) image, and superpose the generated image to an output image. The display unit 906 is driven by a drive signal provided by the video signal processor 905, and displays a video or an image on a video screen of a display apparatus, such as a liquid crystal display, a plasma display, or an organic light emitting display (OLED).

The audio signal processor 907 performs reproduction processing on audio data that is input from the decoder 904, such as digital-to-analog conversion and amplification, and performs audio output using the speaker 908. In addition, the audio signal processor 907 may perform additional processing, such as noise removal, on the audio data.

The external interface 909 is an interface configured to connect the television device 900 and an external apparatus or the network. For example, a video stream or an audio stream received using the external interface 909 may be decoded by the decoder 904. That is, the external interface 909 serves as a sending apparatus in the television device 900 that receives the code stream of the encoded image.

The controller 910 includes a processor and a memory. The memory stores a program to be executed by the processor, program data, auxiliary data, data obtained through the network, and the like. For example, when the television device 900 is started, the program stored in the memory is read and executed by the processor. The processor controls an operation of the television device 900 based on a control signal that is input from the user interface 911.

The user interface 911 is connected to the controller 910. For example, the user interface 911 includes a button and a switch for enabling a user to operate the television device 900, and a receiving unit for receiving a remote control signal. The user interface 911 detects operations performed by the user through these components, generates a control signal, and outputs the generated control signal to the controller 910.

The bus 912 connects the tuner 902, the demultiplexer 903, the decoder 904, the video signal processor 905, the audio signal processor 907, the external interface 909, and the controller 910 to each other.

In the television device 900 having such a structure, the decoder 904 may have a function of the video decoding apparatus or the image prediction apparatus according to the foregoing embodiments. For example, the decoder 904 may be configured to perform intra-frame prediction on a current block using a reference block, to obtain an initial predicted pixel value of a pixel in the current block, and perform weighted filtering on the initial predicted pixel value of the pixel in the current block to obtain a predicted pixel value of the pixel in the current block, where weighting coefficients used for the weighted filtering include a horizontal weighting coefficient and a vertical weighting coefficient, and an attenuation rate factor acting on the horizontal weighting coefficient may be different from an attenuation rate factor acting on the vertical weighting coefficient.

Figure 13:
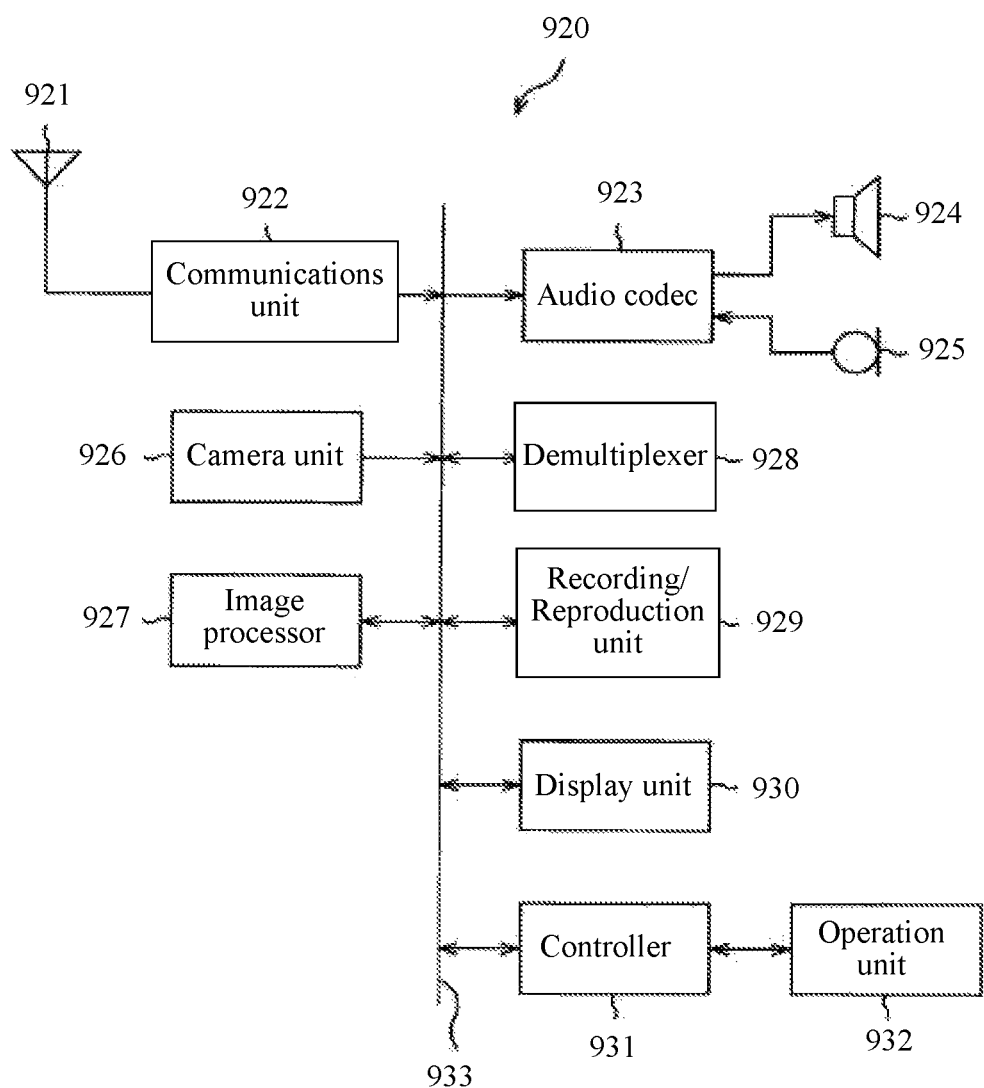
FIG. 13 is a schematic structural diagram of a mobile phone application according to an embodiment of the present application.

FIG. 13 is a schematic structural diagram of a mobile phone application according to an embodiment of this application. A mobile phone apparatus 920 may include an antenna 921, a communications unit 922, an audio codec 923, a speaker 924, a microphone 925, a camera unit 926, an image processor 927, a demultiplexer 928, a recording/reproduction unit 929, a display unit 930, a controller 931, an operation unit 932, a bus 933, and the like.

The antenna 921 is connected to the communications unit 922. The speaker 924 and the microphone 925 are connected to the audio codec 923. The operation unit 932 is connected to the controller 931. The bus 933 connects the communications unit 922, the audio codec 923, the camera unit 926, the image processor 927, the demultiplexer 928, the recording/reproduction unit 929, the display unit 930, and the controller 931.

The mobile phone apparatus 920 performs operations in various operation modes, for example, sends/receives an audio signal, sends/receives an email and image data, photographs an image, and records data. The various operation modes include a voice call mode, a data communication mode, an imaging mode, and a video phone mode.

In the voice call mode, an analog audio signal generated by the microphone 925 is provided to the audio codec 923. The audio codec 923 converts the analog audio signal into audio data, performs analog-to-digital conversion on the converted audio data, and compresses the audio data. Then the audio codec 923 outputs the audio data to the communications unit 922 as a compression result. The communications unit 922 encodes and modulates the audio data to generate a to-be-sent signal. Then the communications unit 922 sends the generated to-be-sent signal to a base station using the antenna 921. The communications unit 922 further amplifies a radio signal received using the antenna 921, and performs frequency conversion on the radio signal received using the antenna 921, to obtain a received signal. Then the communications unit 922 demodulates and decodes the received signal to generate audio data, and outputs the generated audio data to the audio codec 923. The audio codec 923 decompresses the audio data, and performs digital-to-analog conversion on the audio data to generate an analog audio signal. Then the audio codec 923 provides the generated audio signal for the speaker 924 to perform audio output from the speaker 924.

In the data communication mode, for example, the controller 931 generates, based on an operation performed by a user using the operation unit 932, text data to be included in an email. The controller 931 further displays a text on the display unit 930. The controller 931 further generates email data in response to an instruction sent by the user using the operation unit 932, and outputs the generated email data to the communications unit 922. The communications unit 922 encodes and modulates the email data to generate a to-be-sent signal. Then the communications unit 922 sends the generated to-be-sent signal to a base station using the antenna 921. The communications unit 922 further amplifies a radio signal received using the antenna 921, and performs frequency conversion on the radio signal received using the antenna 921 to obtain a received signal. Then the communications unit 922 demodulates and decodes the received signal to recover the email data, and outputs the recovered email data to the controller 931. The controller 931 displays email content on the display unit 930, and stores the email data in a storage medium of the recording/reproduction unit 929.

The recording/reproduction unit 929 includes a readable/writable storage medium. For example, the storage medium may be an internal storage medium, or may be an externally installed storage medium, for example, a hard disk, a magnetic disk, a magneto-optical disk, a USB memory, or a storage card.

In the imaging mode, the camera unit 926 forms an image of an object to generate image data, and outputs the generated image data to the image processor 927. The image processor 927 encodes the image data that is input from the camera unit 926, and stores a code stream in the storage medium of the recording/reproduction unit 929.

In the video phone mode, the demultiplexer 928 multiplexes a video stream that is encoded by the image processor 927 and an audio stream that is input from the audio codec 923, and outputs a multiplexed stream to the communications unit 922. The communications unit 922 encodes and modulates the multiplexed stream to generate a to-be-sent signal. Then the communications unit 922 sends the generated to-be-sent signal to a base station using the antenna 921. The communications unit 922 further amplifies a radio signal received using the antenna 921, and performs frequency conversion on the radio signal received using the antenna 921 to obtain a received signal. The to-be-sent signal and the received signal each may include an encoded bit stream. Then the communications unit 922 demodulates and decodes the received signal to recover a stream, and outputs the recovered stream to the demultiplexer 928. The demultiplexer 928 separates a video stream and an audio stream from an input stream, outputs the video stream to the image processor 927, and outputs the audio streams to audio codec 923. The image processor 927 decodes the video stream to generate video data. The video data is provided to the display unit 930, and a series of images are displayed by the display unit 930. The audio codec 923 decompresses the audio data, and performs digital-to-analog conversion on the audio data to generate an analog audio signal. Then the audio codec 923 provides the generated audio signal for the speaker 924 to perform audio output from the speaker 924.

In the mobile phone apparatus 920 having such a structure, the image processor 927 has a function of the video coding apparatus (the video encoder or the image prediction apparatus) and/or the video decoding apparatus (the video decoder) according to the foregoing embodiments.

For example, the image decoder 927 may be configured to perform intra-frame prediction on a current block using a reference block, to obtain an initial predicted pixel value of a pixel in the current block, and perform weighted filtering on the initial predicted pixel value of the pixel in the current block to obtain a predicted pixel value of the pixel in the current block, where weighting coefficients used for the weighted filtering include a horizontal weighting coefficient and a vertical weighting coefficient, and an attenuation rate factor acting on the horizontal weighting coefficient may be different from an attenuation rate factor acting on the vertical weighting coefficient.

It should be understood that "one embodiment" or "an embodiment" mentioned in the entire specification means that particular characteristics, structures, or features related to the embodiment are included in at least one embodiment of this application. Therefore, "in one embodiment" or "in an embodiment" appearing throughout the specification does not refer to a same embodiment. In addition, these particular characteristics, structures, or features may be combined in one or more embodiments using any appropriate manner. Persons skilled in the art should also appreciate that all the embodiments described in the specification are optional embodiments, and the related actions and modules are not necessarily mandatory to this application.

It should be understood that certainty sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. It should be understood that the term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that in the embodiments provided in this application, "B corresponding to A" indicates that B is associated with A, and B may be determined according to A. However, it should further be understood that determining B according to A does not mean that B is determined according to A only, that is, B may also be determined according to A and/or other information.

All or some of the foregoing embodiments may be implemented through software, hardware, firmware, or any combination thereof. When the software is used to implement the embodiments, the embodiments may be implemented fully or partially in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instruction may be stored in a computer readable storage medium, or may be transmitted from a computer readable storage medium to another computer readable storage medium. For example, the computer instruction may be transmitted from one website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible to the computer, or a data storage device, such as a server or a data center, integrating one or more usable media. The usable medium may be a magnetic medium (the magnetic medium may be, for example, a floppy disk, a hard disk, or a magnetic tape), an optical medium (for example, an optical disc)), a semiconductor medium (for example, a solid-state drive), or the like. In the foregoing embodiments, the description of each embodiment has respective focuses. For a part that is not described in detail in a specific embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical or other forms.

The units described as separated parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-accessible storage. Based on such an understanding, the technical solutions of this application essentially, or the part contributing to other approaches, or all or some of the technical solutions may be implemented in a form of a software product. The computer software product is stored in a memory and includes several requests for instructing a computer device (which may be a personal computer, a server, a network device, or the like, and may be further a processor in a computer device) to perform all or some of the steps of the foregoing methods described in the embodiments of this application.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An image prediction method, comprising:
performing intra-frame prediction on a current block using a reference block to obtain an initial predicted pixel value of a pixel in the current block; and
performing weighted filtering on the initial predicted pixel value to obtain a predicted pixel value of the pixel, wherein weighting coefficients used for the weighted filtering comprise a horizontal weighting coefficient and a vertical weighting coefficient, and wherein a first attenuation rate factor acting on the horizontal weighting coefficient is different from a second attenuation rate factor acting on the vertical weighting coefficient.

2. The image prediction method of claim 1, wherein the first attenuation rate factor is different from the second attenuation rate factor when a difference between a horizontal texture feature and a vertical texture feature of the current block exceeds a difference threshold.

3. The image prediction method of claim 2, wherein the horizontal texture feature or the vertical texture feature comprises at least one of a side length, an auto variance, or an edge acutance.

4. The image predication method of claim 2, wherein performing the weighted filtering on the initial predicted pixel value comprises performing the weighted filtering on the initial predicted pixel value according to:

$$p''[x, y] = \left\{ \begin{array}{l} (c_{top} \gg [y/d_2])r[x, -1] - (c_{topleft} \gg [x/d_1])r[-1, -1] + \\ (c_{left} \gg [x/d_1])r[-1, y] + c_{cur}p'[x, y] + 32 \end{array} \right\} \gg 6;$$

$$\text{and } c_{cur} = 64 - (c_{top} \gg [y/d_2]) - (c_{left} \gg [x/d_1]) + (c_{topleft} \gg [x/d_1]),$$

wherein $c_{top}$ is a horizontal weighting coefficient corresponding to a reconstructed pixel value of a top adjacent reference block of the current block, wherein $c_{left}$ represents a vertical weighting coefficient corresponding to a reconstructed pixel value of a left adjacent reference block of the current block, wherein $c_{topleft}$ represents a vertical weighting coefficient corresponding to a reconstructed pixel value of a top-left adjacent reference block of the current block, wherein x represents a horizontal coordinate of a pixel in the current block relative to a top-left vertex of the current block, wherein y represents a vertical coordinate of the pixel in the current block relative to the top-left vertex of the current block, wherein $d_1$ is the second attenuation rate factor, wherein $d_2$ is the first attenuation rate factor, wherein $d_1$ and $d_2$ are real numbers, wherein p"[x, y] represents a predicted pixel value of a pixel whose coordinates are [x, y] in the current block, wherein p'[x, y] represents an initial predicted pixel value of the pixel whose coordinates are [x, y] in the current block, wherein r [x, −1] represents a reconstructed pixel value of a pixel whose coordinates are [x, −1] in the top adjacent reference block, wherein r [−1, −1] represents a reconstructed pixel value of a pixel whose coordinates are [−1, −1] in the top-left adjacent reference block, and wherein r[−1,y] represents a reconstructed pixel value of a pixel whose coordinates are [−1,y] in the left adjacent reference block.

5. The image predication method of claim 4, wherein a texture feature comprises a side length, wherein the difference threshold comprises a thresh1, wherein $d_1=1$ and $d_2=2$ when a first ratio of a length to a width of the current block is greater than the thresh1, wherein $d_1=2$ and $d_2=1$ when a second ratio of the width to the length is greater than the thresh1, and wherein thresh1 is a real number greater than 2.

6. The image predication method of claim 5, wherein the length is greater than or equal to the width when the first ratio is less than the thresh1, wherein $d_1=d_2=2$ when a sum of the length and the width is greater than a thresh4, wherein $d_1=d_2=1$ when the first ratio is less than the thresh1, the length is greater than or equal to the width, and the sum of the length and the width is less than or equal to the thresh4, and wherein thresh4 is a real number greater than or equal to 64.

7. The image predication method of claim 4, wherein $d_1=2$ when a length of the current block is greater than a thresh2, wherein $d_1=1$ when the length is less than or equal to the thresh2, wherein thresh2 is a real number greater than or equal to sixteen, wherein $d_2=2$ when a width of the current block is greater than a thresh3, wherein $d_2=1$ when the width is less than or equal to the thresh3, and wherein thresh3 is a real number greater than or equal to 16.

8. The image predication method of claim 1, wherein performing the intra-frame prediction comprises:
filtering a reconstructed pixel value of a reference pixel in the reference block to obtain a filtered pixel value of the reference pixel, and performing the intra-frame prediction on the current block using the filtered pixel value to obtain the initial predicted pixel value; or
performing the intra-frame prediction on the current block using the reconstructed pixel value of the reference pixel in the reference block to obtain the initial predicted pixel value of the pixel in the current block.

9. The image predication method of claim 1, wherein the intra-frame prediction is directional intra-frame prediction, direct current coefficient intra-frame prediction, or interpolation intra-frame prediction.

10. The image predication method of claim 1, wherein the image prediction method is applied to a video coding process or a video decoding process.

11. An image prediction apparatus, comprising:
a memory comprising instructions; and
a processor coupled to the memory, wherein the instructions cause the processor to be configured to:
perform intra-frame prediction on a current block using a reference block to obtain an initial predicted pixel value of a pixel in the current block; and
perform weighted filtering on the initial predicted pixel value to obtain a predicted pixel value of the pixel, wherein weighting coefficients used for the weighted filtering comprise a horizontal weighting coefficient and a vertical weighting coefficient, and wherein a first attenuation rate factor acting on the horizontal weighting coefficient is different from a second attenuation rate factor acting on the vertical weighting coefficient.

12. The image prediction apparatus of claim 11, wherein the first attenuation rate factor is different from the second attenuation rate factor when a difference between a horizontal texture feature and a vertical texture feature of the current block exceeds a difference threshold.

13. The image prediction apparatus of claim 12, wherein the horizontal texture feature the vertical texture feature comprises at least one of a side length, an auto variance, or an edge acutance.

14. The image prediction apparatus of claim 12, wherein the instructions further cause the processor to be configured to perform the weighted filtering on the initial predicted pixel value according to:

$$p''[x, y] = \{(c_{top} \gg [y/d_2])r[x, -1] - (c_{topleft} \gg [x/d_1])r[-1, -1] +$$
$$(c_{left} \gg [x/d_1])r[-1, y] + c_{cur}p'[x, y] + 32\} \gg 6; \text{ and}$$
$$c_{cur} = 64 - (c_{top} \gg [y/d_2]) - (c_{left} \gg [x/d_1]) + (c_{topleft} \gg [x/d_1]),$$

wherein $c_{top}$ is a horizontal weighting coefficient corresponding to a reconstructed pixel value of a top adjacent reference block of the current block, wherein $c_{left}$ represents a vertical weighting coefficient corresponding to a reconstructed pixel value of a left adjacent reference block of the current block, wherein $c_{topleft}$ represents a vertical weighting coefficient corresponding to a reconstructed pixel value of a top-left adjacent reference block of the current block, wherein x represents a horizontal coordinate of a pixel in the current block relative to a top-left vertex of the current block, wherein y represents a vertical coordinate of the pixel in the current block relative to the top-left vertex of the current block, wherein $d_2$ is the first attenuation rate factor, wherein $d_1$ is the second attenuation rate factor, wherein $d_1$ and $d_2$ are real numbers, wherein p"[x, y] represents a predicted pixel value of a pixel whose coordinates are [x, y] in the current block, wherein p'[x, y] represents an initial predicted pixel value of the pixel whose coordinates are [x, y] in the current block, wherein r [x, −1] represents a reconstructed pixel value of a pixel whose coordinates are [x, −1] in the top adjacent reference block, wherein r[−1, −1] represents a reconstructed pixel value of a pixel whose coordinates are [−1, −1] in the top-left adjacent reference block, and wherein r[−1,y] represents a reconstructed pixel value of a pixel whose coordinates are [−1,y] in the left adjacent reference block.

15. The image prediction apparatus of claim 14, wherein a texture feature comprises a side length, wherein the difference threshold comprises a thresh1, wherein $d_1=1$ and $d_2=2$ when a first ratio of a length to a width of the current block is greater than the thresh1, wherein $d_1=2$ and $d_2=1$ when a second ratio of the width to the length is greater than the thresh1, and wherein thresh1 is a real number greater than two.

16. The image prediction apparatus of claim 15, wherein the length is greater than or equal to the width when the first ratio is less than the thresh1, wherein $d_1=d_2=2$ when a sum of the length and the width is greater than a thresh4, wherein $d_1=d_2=1$ when the first ratio is less than the thresh1, the length is greater than or equal to the width, and the sum of the length and the width is less than or equal to the thresh4, and wherein thresh4 is a real number greater than or equal to sixty four.

17. The image prediction apparatus of claim 14, wherein a texture feature comprises a side length, wherein $d_1=2$ when a length of the current block is greater than a thresh2, wherein $d_1=1$ when the length is less than or equal to the thresh2, wherein thresh2 is a real number greater than or equal to sixteen, wherein $d_2=2$ when a width of the current block is greater than a thresh3, wherein $d_2=1$ when the width is less than or equal to the thresh3, and wherein thresh3 is a real number greater than or equal to sixteen.

18. The image prediction apparatus of claim 11, wherein the instructions further cause the processor to be configured to:
filter a reconstructed pixel value of a reference pixel in the reference block to obtain a filtered pixel value of the reference pixel, and perform the intra-frame prediction on the current block using the filtered pixel value to obtain the initial predicted pixel value; or
perform the intra-frame prediction on the current block using the reconstructed pixel value to obtain the initial predicted pixel value.

19. The image prediction apparatus of claim 11, wherein the intra-frame prediction is directional intra-frame prediction, direct current coefficient intra-frame prediction, or interpolation intra-frame prediction.

20. The image prediction apparatus of claim 11, wherein the image prediction apparatus is a video coding apparatus or a video decoding apparatus.

21. A computer program product comprising computer-executable instructions stored on a non-transitory computer-readable medium that, when executed by a processor, cause an apparatus to:
perform intra-frame prediction on a current block using a reference block to obtain an initial predicted pixel value of a pixel in the current block; and
perform weighted filtering on the initial predicted pixel value to obtain a predicted pixel value of the pixel, wherein weighting coefficients used for the weighted filtering comprise a horizontal weighting coefficient and a vertical weighting coefficient, and wherein a first attenuation rate factor acting on the horizontal weighting coefficient is different from a second attenuation rate factor acting on the vertical weighting coefficient.

* * * * *